(12) United States Patent
Bodtker et al.

(10) Patent No.: US 11,613,298 B1
(45) Date of Patent: Mar. 28, 2023

(54) MOUNTING BRACKET ASSEMBLY

(71) Applicant: Steering Solutions IP Holding Corporation, Saginaw, MI (US)

(72) Inventors: Joen C. Bodtker, Flint, MI (US); Michael P. Anspaugh, Bay City, MI (US); Scott E. Rezmer, Bay City, MI (US); Melvin L. Tinnin, Clio, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 17/561,770

(22) Filed: Dec. 24, 2021

(51) Int. Cl.
*B62D 1/187* (2006.01)
*B62D 1/19* (2006.01)

(52) U.S. Cl.
CPC ............. *B62D 1/187* (2013.01); *B62D 1/195* (2013.01)

(58) Field of Classification Search
CPC .................................. B62D 1/187; B62D 1/195
See application file for complete search history.

(56) References Cited

U.S. PATENT DOCUMENTS 4,241,937 A * 12/1980 Eggen .................... B62D 1/195
74/492
4,452,096 A * 6/1984 Workman .............. B62D 1/195
280/779
5,390,955 A * 2/1995 Kaliszewski .......... B62D 1/195
74/492
2020/0172146 A1 * 6/2020 Stinebring ............ F16B 7/0406

FOREIGN PATENT DOCUMENTS

DE 19911485 A1 * 9/1999 ............. B62D 1/189
EP 0448246 A1 * 3/1990
EP 0458456 A1 * 4/1991

* cited by examiner

Primary Examiner — Drew J Brown
(74) Attorney, Agent, or Firm — Dickinson Wright PLLC

(57) ABSTRACT

A steering column assembly includes a jacket extending along an axis and including a pair of jacket mounting plates on opposite sides of the axis. The steering column assembly also includes a mounting bracket including a pair of mounting bracket plates spaced by a bridge, wherein each of the mounting bracket plates is operably connected to a jacket mounting plate. The steering column assembly further includes at least one of the mounting bracket plates including a mating aperture defined by a pivot portion that is circular and an insertion slot extending outwardly from the pivot portion. The steering column assembly yet further includes at least one of the jacket mounting plates including a mating projection that includes at least one tab interfacing with opposite sides of the pivot portion. The insertion slot is sized to allow the at least one tab to be inserted therein during assembly.

20 Claims, 20 Drawing Sheets

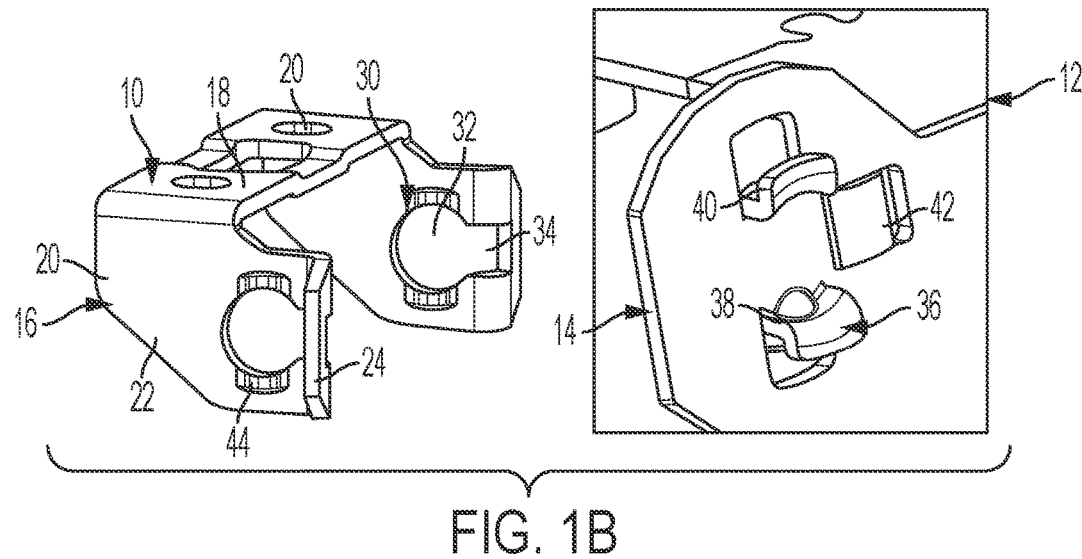
FIG. 1B
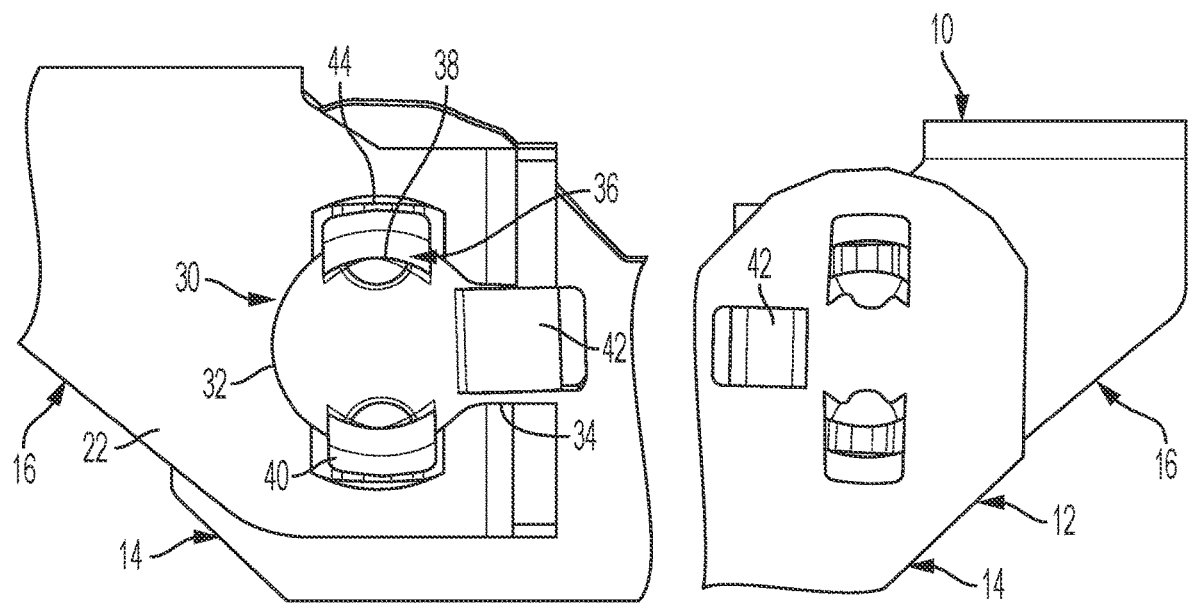
FIG. 1C
FIG. 1D

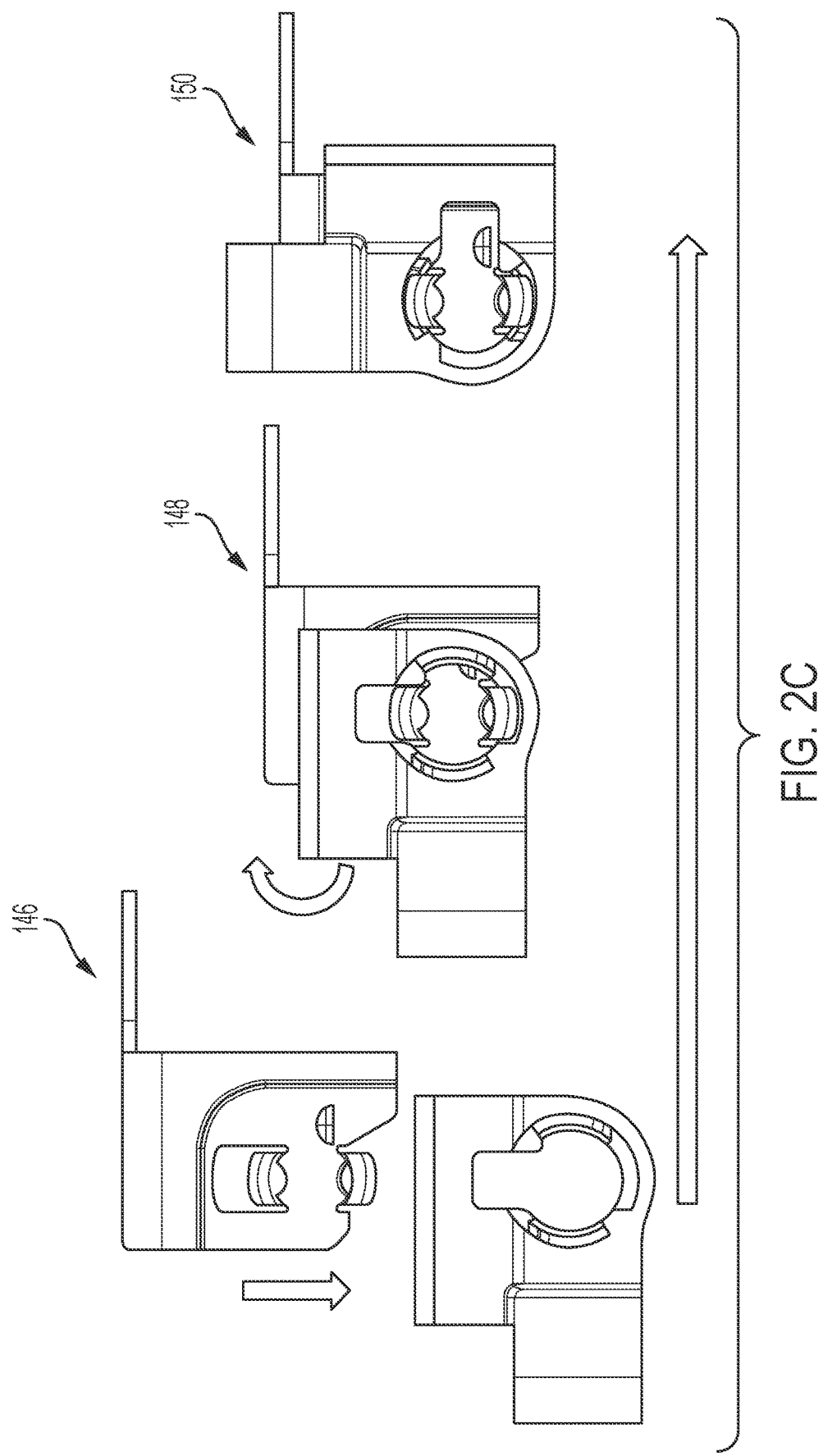

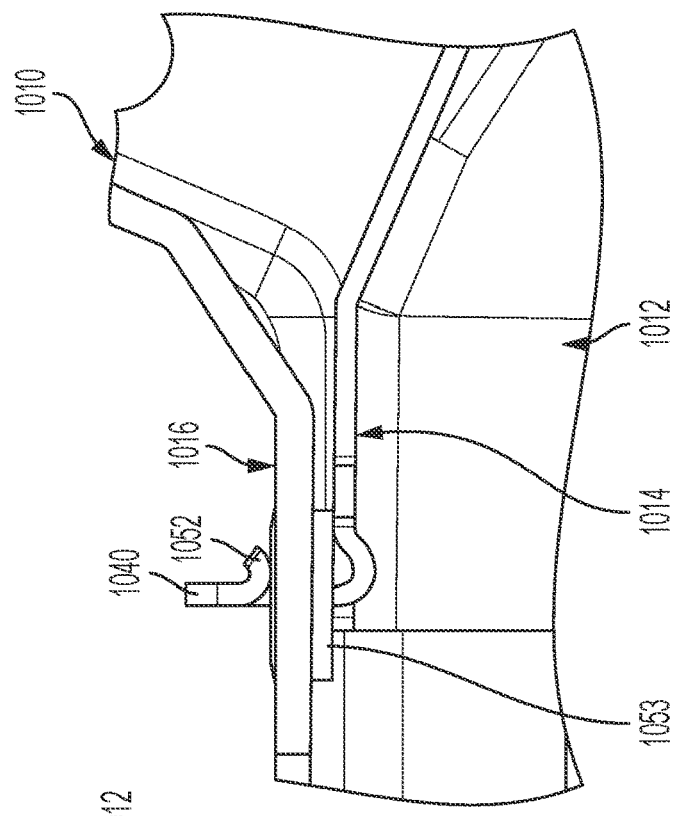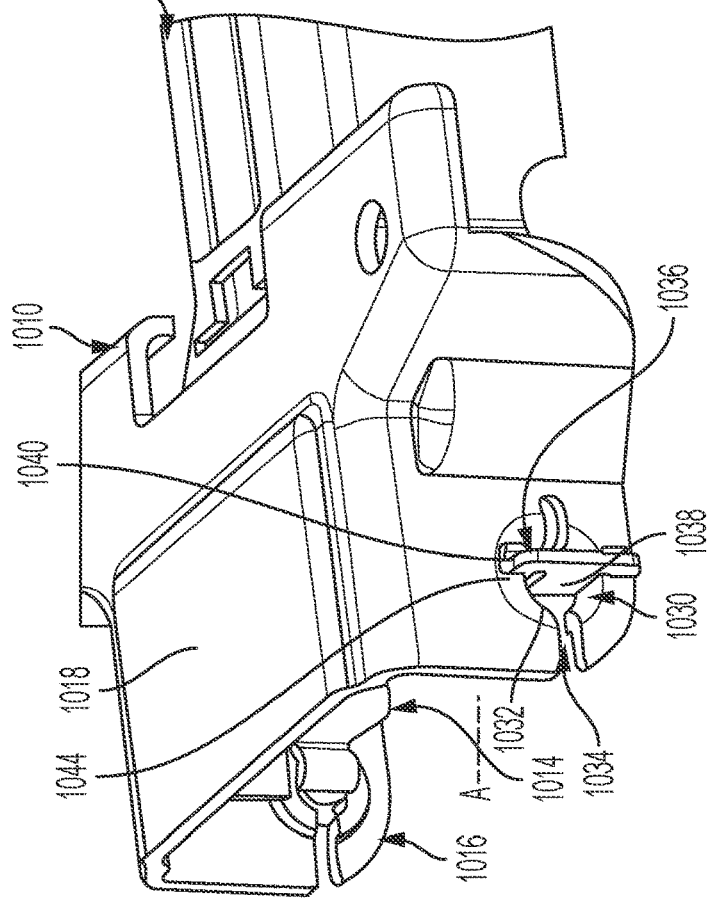
FIG. 11B
FIG. 11A

MOUNTING BRACKET ASSEMBLY

TECHNICAL FIELD

The following description relates to mounting brackets, and more particularly, to a mounting bracket for a steering column with a twist lock feature.

BACKGROUND

Steering columns in vehicles may be adjustable in a rake direction and a telescope direction. The adjustable steering column may be unlocked in order to be adjusted to a desired position. Once the desired position is reached, the steering column may be locked in place to resist movement from the desired position.

A traditional adjustable steering column may include a pair of jackets fixed to a vehicle by a mounting bracket. The pair of jackets are movable relative to the mounting bracket via connections that allow a certain amount of articulation. Typically, mounting brackets are attached to one of the pair of mounting brackets via an assemblage of parts that require greasing and a certain amount of upkeep. During assembly, special equipment is also required that incurs capital expense and increases cycle time. Accordingly, to meet the low cost demand of customers in the automotive market, simple low cost alternatives to current products are constantly sought.

SUMMARY

According to one aspect of the disclosure, a steering column assembly includes a jacket extending along an axis and including a pair of jacket mounting plates on opposite sides of the axis. The steering column assembly also includes a mounting bracket including a pair of mounting bracket plates spaced by a bridge, wherein each of the mounting bracket plates is operably connected to a jacket mounting plate. The steering column assembly further includes at least one of the mounting bracket plates including a mating aperture defined by a pivot portion that is circular and an insertion slot extending outwardly from the pivot portion. The steering column assembly yet further includes at least one of the jacket mounting plates including a mating projection that includes at least one tab interfacing with opposite sides of the pivot portion. The insertion slot is sized to allow the at least one tab to be inserted therein during assembly.

According to another aspect of the disclosure, a steering column assembly includes a jacket extending along an axis and including a pair of jacket mounting plates on opposite sides of the axis. The steering column assembly also includes a mounting bracket including a pair of mounting bracket plates spaced by a bridge, wherein each of the mounting bracket plates is operably connected to a jacket mounting plate. The steering column assembly further includes at least one of the jacket mounting plates including a mating aperture defined by a pivot portion that is circular and an insertion slot extending outwardly from the pivot portion. The steering column assembly yet further includes at least one of the mounting bracket plates including a mating projection that includes at least one tab extending inwardly to interface with opposite sides of the pivot portion and a cantilever extending from the at least one tab that overhangs a surface of the jacket mounting plate surrounding the pivot portion. The insertion slot is sized to allow the cantilever and the at least one tab to be inserted therein during assembly.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. This section provides a general summary of the disclosure and is not to be interpreted as a complete and comprehensive listing of all of the objects, aspects, features and advantages associated with the present disclosure. These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, unless otherwise expressed herein, the various features of the drawings are not to-scale. On the contrary, the dimensions of the various features are arbitrarily expanded or reduced for clarity.

FIG. 1B generally illustrates an enlarged view of interfacing connection portions of the mounting bracket and the jacket in accordance with the first arrangement.

FIG. 1C generally illustrates an enlarged exterior view the mounting bracket connected to the jacket in accordance with the first arrangement.

FIG. 1D generally illustrates an enlarged interior view the mounting bracket connected to the jacket in accordance with the first arrangement.

FIG. 1I generally illustrates an assembly process of connecting the mounting bracket to the jacket in accordance with the first arrangement.

FIG. 2C generally illustrates an assembly process of connecting the mounting bracket to the jacket in accordance with the second arrangement.

DETAILED DESCRIPTION

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, typical mounting brackets are attached to one of the pair of mounting brackets via an assemblage of parts that require greasing and a certain amount of upkeep and specialized tools. Accordingly, the subject disclosure relates to a mounting bracket and a jacket connection that includes a mating aperture and a mating projection that is located, and at least partially pivotal within, the mating aperture. In some embodiments, the mounting bracket may include the mating aperture and the jacket may include the mating projection. As such, the additional assemblage parts traditionally required are no longer needed, nor is special equipment needed to connect the mounting bracket and jacket. While multiple arrangements are disclosed herein, it should be appreciated that, unless explicitly stated, one arrangement may include all the same features, constructions, interfacing characteristics, relative sizes, and materials as described in the other arrangements herein. It should also be appreciated that the elements and features associated with either a mounting bracket or a jacket to facilitate connection may be integral with the associated mounting bracket or jacket (e.g. stamped or otherwise shaped from). Moreover, it should also be appreciated that the mating projections and the mounting apertures described herein may be located on either the jacket or the mounting bracket without departing from the scope of the subject disclosure.

Figure 1A:
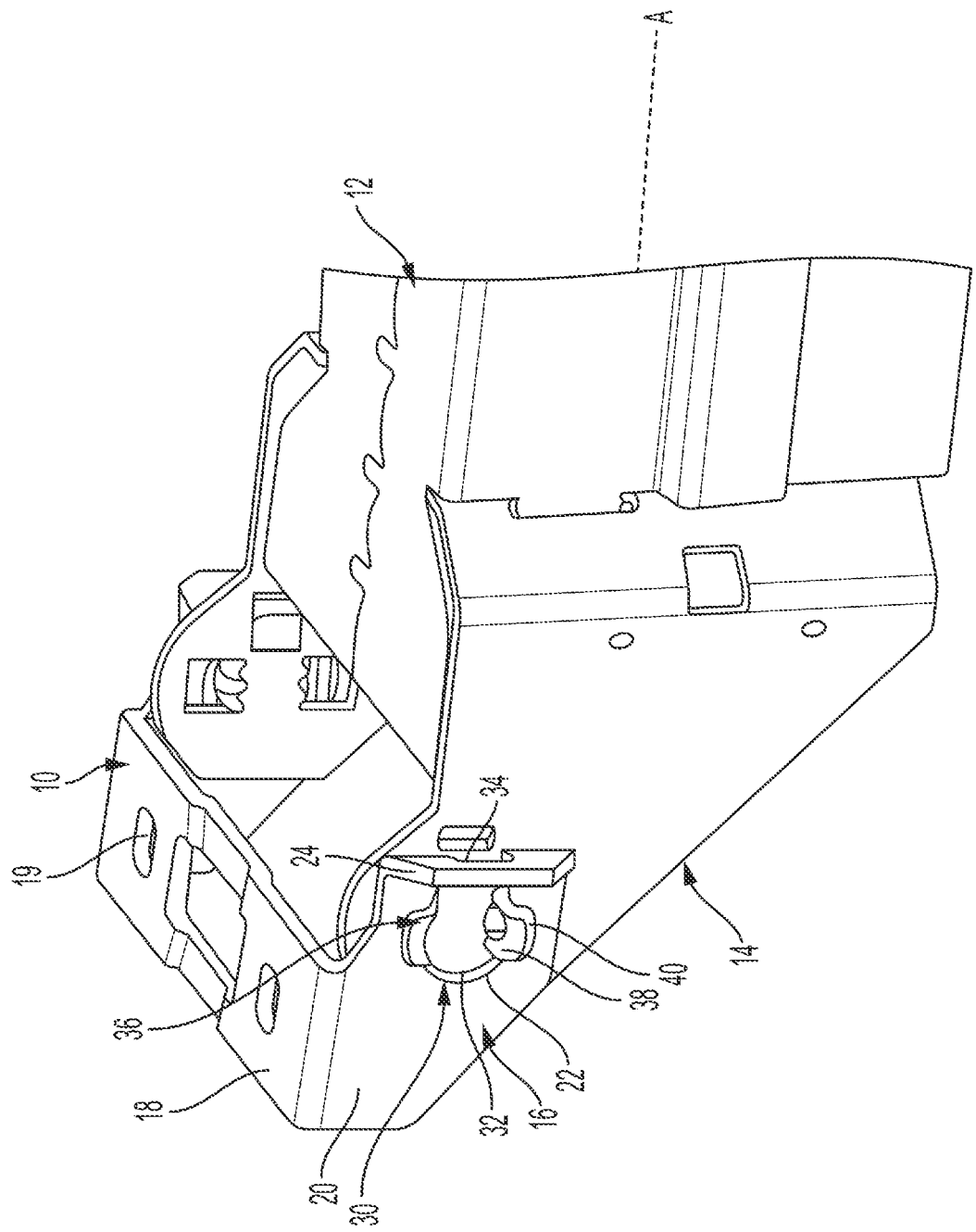
FIG. 1A generally illustrates a mounting bracket connected to a jacket according to a first arrangement of the present disclosure.

Referring initially to FIG. 1A, a steering column includes a mounting bracket 10 connected to a jacket 12 in accordance with a first arrangement. The in some embodiments, the jacket 12 may be a lower jacket. The jacket 12 extends along an axis A and includes a pair of jacket mounting plates 14 for connection to the mounting bracket 10. More particularly, the mounting bracket 10 includes a pair of mounting bracket plates 16 spaced by a bridge 18. The bridge 18 may include one or more openings 19 for mounting to a vehicle with fasteners (not shown). The mounting bracket plates 16 may each include a first portion 20 projecting perpendicular from the bridge 18 and a mounting portion 22 projecting transversely from the first portion 20 opposite the bridge 18. The first portion 20 and mounting portion 22 may therefore define an "L" shape. The mounting portion 20 may include a flange 24 extending therefrom opposite the first portion 20. The flange 24 may extend outwardly from the axis A. The pair of jacket mounting plates 14 may be configured to be connected to the mounting bracket plates 16. The jacket mounting plates 14 may extend from an end 28 of the jacket 12. In some embodiments, the jacket mounting plates 14 may be sized to fit between the mounting bracket plates 16. As such, each jacket mounting plate 14 may interface with an inner surface of one of the mounting bracket plates 16.

With continued reference to FIG. 1A, at least one of the jacket mounting plates 14 (e.g. both jacket mounting plates 14) includes a mating aperture 30. Each mating aperture 30 includes a pivot portion 32 that is circular and an insertion slot 34 that extends outwardly from the pivot portion 32. The mating aperture 30 may be located at least partially on the mounting portion 22 and the slot 34 may extend through the flange 24 to define a flange clearance.

At least one of the jacket mounting plates 14 (e.g. both jacket mounting plates 14) includes a mating projection 36. Each mating projection 36 may include at least one tab 38 interfacing with opposite sides of the pivot portion 32 and a cantilever 40 extending from each tab 38 that overhangs a surface of the mounting bracket plate 16 surrounding the pivot portion 32. As illustrated, the at least one tab 38 may include a pair of opposing tabs 38 each opposing tab 38 may have a rounded outer surface for interfacing with an edge of the pivot portion 32 to facilitate pivotal movement therebetween. The opposing tabs 38 may be located on diametrically opposite sides of the pivot portion 32 such that the cantilevers 40 extend in opposite directions. The insertion slot 34 is sized to allow the cantilever 40 to be inserted therein. In some embodiments, the flange clearance on each mounting bracket plate 16 permits the entire mating projections 36 to be inserted therein with linear movement during assembly.

FIGS. 1B through 1D generally illustrate enlarged views of interfacing connection portions of the mounting bracket 10 and the jacket 12. More particularly, FIG. 1B illustrates the mounting bracket 10 and the jacket 12 in a disconnected state, the jacket mounting plate 14 may include an anti-rotation projection 42 extending transversely to the pair of tabs 38. The anti-rotation projection 42 is located to be spaced within the insertion slot 34. The mounting bracket plate 16 may include a bump 44 on diametrically opposite sides of the pivot portion 32 for interfacing with the cantilevers 40 and pushing the cantilever 40 (e.g. bending) outwardly and/or the bumps 44 inwardly. More particularly, a groove may be located on the mounting bracket plate 16 opposite the bumps 44 to permit inward flexing during assembly. As such, when assembled, portions of the mounting bracket plate 16 may be biased inwardly to facilitate retaining the connection between the mounting bracket 10 and the jacket 12. As illustrated in FIG. 1C, the anti-rotation projection 42 may be sized to move within the slot 34 to permit a limited degree of pivotal movement between the mounting bracket 10 and the jacket 12. FIG. 1D generally illustrates an enlarged interior view the mounting bracket 10 connected to the jacket 12. It should be appreciated that prior to assembly, the pair of tabs 38 may define an outer diameter (e.g. between the rounded outer surfaces) that is greater than a diameter of the pivot portion 32. As such, each mating aperture 30 and each mating projection 36 may form a compression fit connection.

Figure 1E:
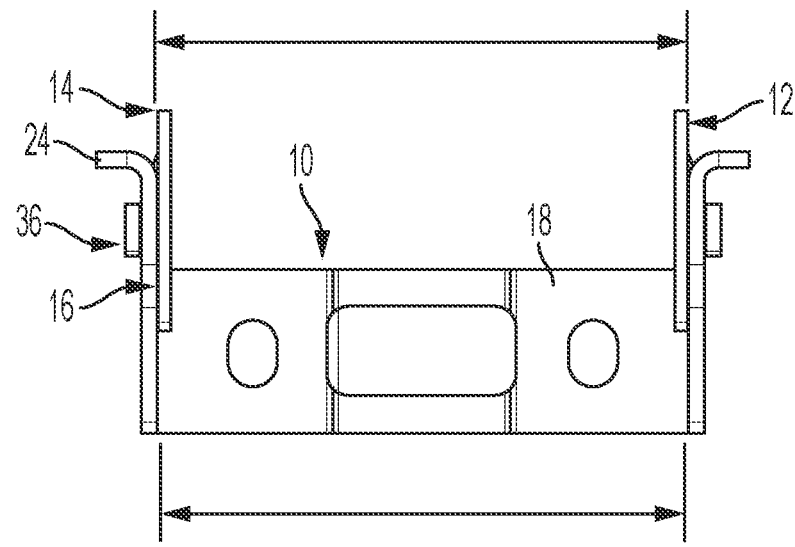
FIG. 1E generally illustrates an enlarged lower view the mounting bracket connected to the jacket in accordance with the first arrangement.
Figure 1F:
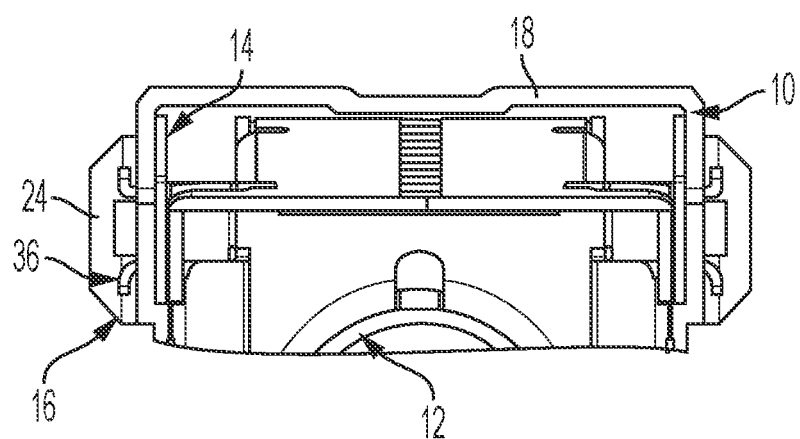
FIG. 1F generally illustrates an enlarged end view the mounting bracket connected to the jacket in accordance with the first arrangement.
Figure 1G:
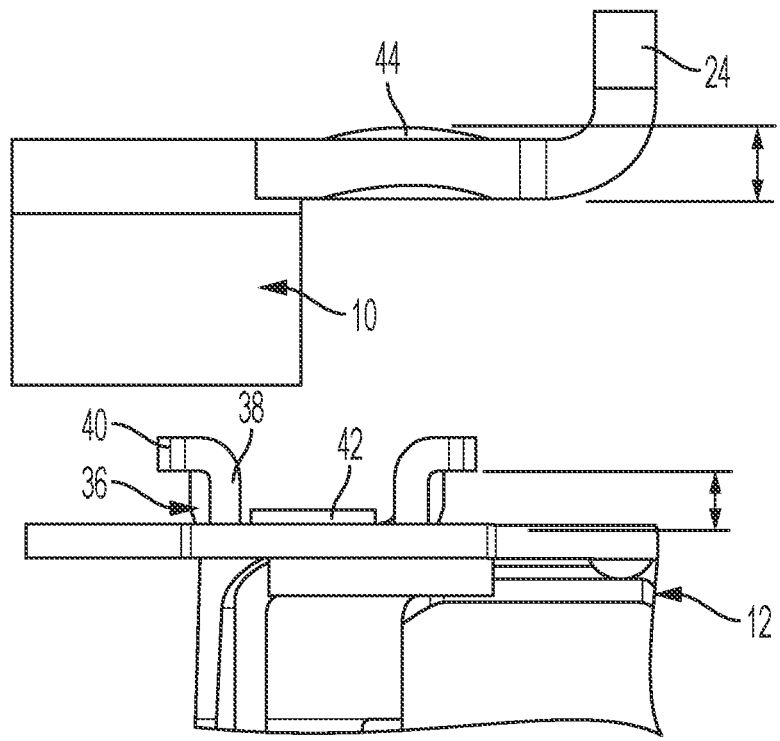
FIG. 1G generally illustrates an enlarged end view of the interfacing connection portions of the mounting bracket and the jacket in a disconnected state in accordance with the first arrangement.
Figure 1H:
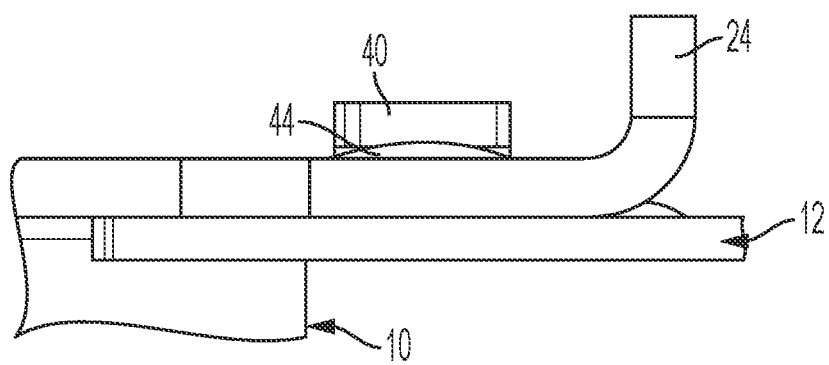
FIG. 1H generally illustrates an enlarged lower view of the interfacing connection portions of the mounting bracket and the jacket in a connected state in accordance with the first arrangement.

FIGS. 1E through 1H generally illustrate enlarged views of interfacing connection portions of the mounting bracket 10 and the jacket 12 from additional perspectives. As best illustrated in FIGS. 1E and 1F, an inner width may be defined by inner surface of the mounting bracket plates 26 and an outer width may be defined by an outer surface of the jacket mounting plates 14. In some embodiments, the outer width may be larger than the inner width such that the mounting bracket 10 is at least partially elastically deformed during assembly to the jacket 12. It should also be appreciated with reference to FIG. 1F that the opposing cantilevers may wider than the insertion slot 34 when the bridge 18 is oriented for connection to the vehicle, such that the mounting bracket 10 cannot be removed from the jacket 12 without relative articulation until both cantilevers 40 are aligned with a length of the insertion slot 34. FIG. 1G and FIG. 1H generally illustrate an enlarged end view of the bump 44 on the mounting bracket interfacing with the cantilever 40 the jacket in a disconnected state according to the first arrangement. In some embodiments, a width between an apex of the bump 44 and an opposing side of the mounting bracket plate 16 may be larger than a width between an undersurface of the cantilever 40 and a base of the tab 38.

FIG. 1I generally illustrates an assembly process of connecting the mounting bracket 10 to the jacket 12 according to the first arrangement. Starting from the leftmost image and moving right, at 46, the assembly process begins with aligning the mating aperture 30 (e.g. the insertion slot 34) with the mating projection 36. For example, the mounting bracket 10 may be turned until the opposing cantilevers 40 are aligned with a length of the insertion slot 34. After alignment, at 48, the mounting bracket 10 and the jacket 12 may be moved linearly together such that the mating projection 36 enters the insertion slot 34 (e.g. through the flange clearance and into the insertion slot 34). Step 48 may include flexing the mounting bracket plates 26 away from one another to fit over the jacket mounting plates 14. At 50, the assembly process may include rotating the mounting bracket 10 with respect to the jacket 12 until the cantilevers 40 are no longer aligned with the length of the insertion slot 34. Step 50 may include further flexing of the mounting bracket plate 16 as the cantilevers 40 are rotated into alignment with the bumps 44 (see FIG. 1A).

Figure 2B:
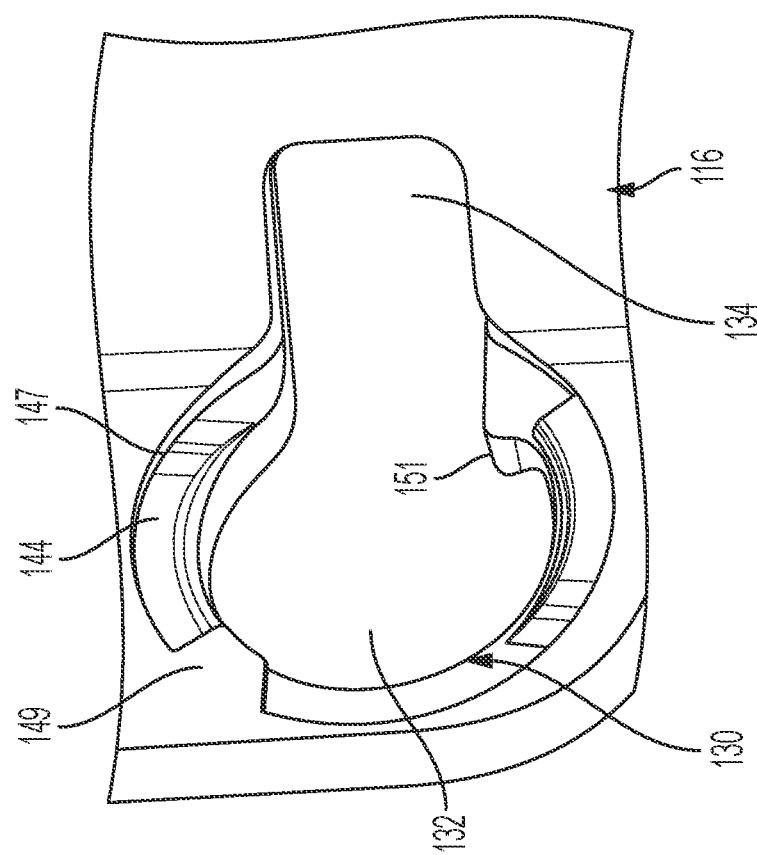
FIG. 2B generally illustrates an enlarged end view of the interfacing connection portion of the mounting bracket in accordance with the second arrangement.
Figure 2A:
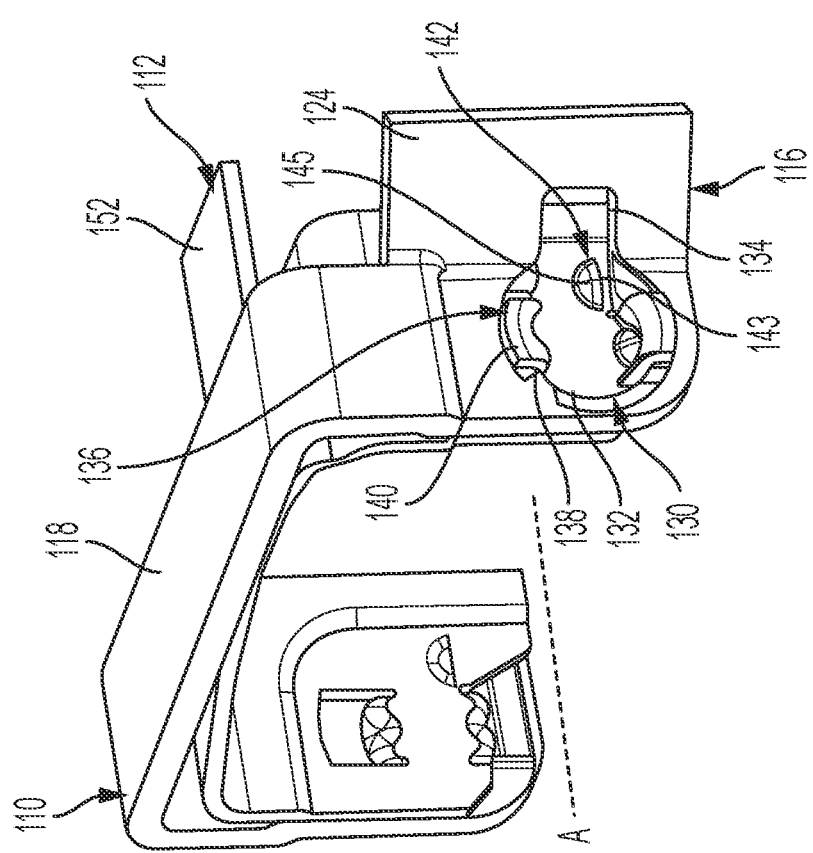
FIG. 2A generally illustrates a mounting bracket connected to a jacket according to a second arrangement of the present disclosure.

FIG. 2A generally illustrates a mounting bracket 110 connected to a jacket 112 according to a second arrangement of the present disclosure. The jacket 112 extends along an axis A and includes a pair of jacket mounting plates 114 for connection to the mounting bracket 110. More particularly, the mounting bracket 110 includes a pair of mounting bracket plates 116 spaced by a bridge 118 and extending to a flange 124. At least one of the jacket mounting plates 114 (e.g. both jacket mounting plates 114) includes a mating aperture 130. Each mating aperture 130 includes a pivot portion 132 that is circular and an insertion slot 134 that extends outwardly from the pivot portion 132. The insertion slot 134 may extend through the flange 124 to define a flange clearance. At least one of the jacket mounting plates 114 (e.g. both jacket mounting plates 114) includes a mating projection 136. Each mating projection 136 may include at least one tab 138 (e.g. diametrically opposed tabs 138) interfacing with opposite sides of the pivot portion 132 and a cantilever 140 extending from each tab 138 that overhangs a surface of the mounting bracket plate 116 surrounding the pivot portion 132. The jacket mounting plate 114 may include an anti-rotation projection 142 extending transversely to the pair of tabs 138. The anti-rotation projection 142 is located to be spaced within the insertion slot 134. The anti-rotation projection 142 may be sized to move within the insertion slot 134 to permit a limited degree of pivotal movement between the mounting bracket 110 and the jacket 112. The anti-rotation projection 142 may include a stop face 143 for forming a hard stop in a first pivot direction and a ramped face 145 for permitting assembly in a second pivot direction.

FIG. 2B generally illustrates an enlarged end view of the interfacing connection portion of the mounting bracket 110. The mounting bracket plates 116 may define a cantilever retaining depression 147 with a pair of oppositely extending ramps 144 that bend the cantilevers 140 outwardly. The cantilever retaining depression 147 includes a hard stop projection 149 for interfacing with the cantilevers 140 and limiting pivotal movement between the mounting bracket 110 and the jacket 112. An inner surface of the pivot portion 132 may include a hooked inner surface projection 151 that further limits pivotal movement between the mounting bracket 110 and the jacket 112. It should be appreciated that the jacket 112 may be a multi-piece component. As such, the jacket 112 may include a buckle 152 that may be sized for connection with a second jacket portion (not shown).

FIG. 2C generally illustrates an assembly process of connecting the mounting bracket to the jacket according to the second arrangement. Starting from the leftmost image and moving right, at 146, the assembly process begins with aligning the mating aperture 130 (e.g. the insertion slot 134) with the mating projection 136. For example, the mounting bracket 110 may be turned until the opposing cantilevers 140 are aligned with a length of the insertion slot 134. After alignment, at 148, the mounting bracket 110 and the jacket 112 may be moved linearly together such that the mating projection 136 enters the insertion slot 134 (e.g. through the flange clearance and into the insertion slot 34). Step 148 may include flexing the mounting bracket plates 126 away from one another to fit over the jacket mounting plates 114. At 150, the assembly process may include rotating the mounting bracket 110 with respect to the jacket 112 until the cantilevers 140 are no longer aligned with the length of the insertion slot 134. Step 150 may include further flexing of the mounting bracket plate 116 as the cantilevers 140 are rotated along ramps 144 and locked between the hard stop projection 149 and the hooked inner surface projection 151. Additional steps may include connecting the buckle 152 to a second jacket portion.

Figure 3:
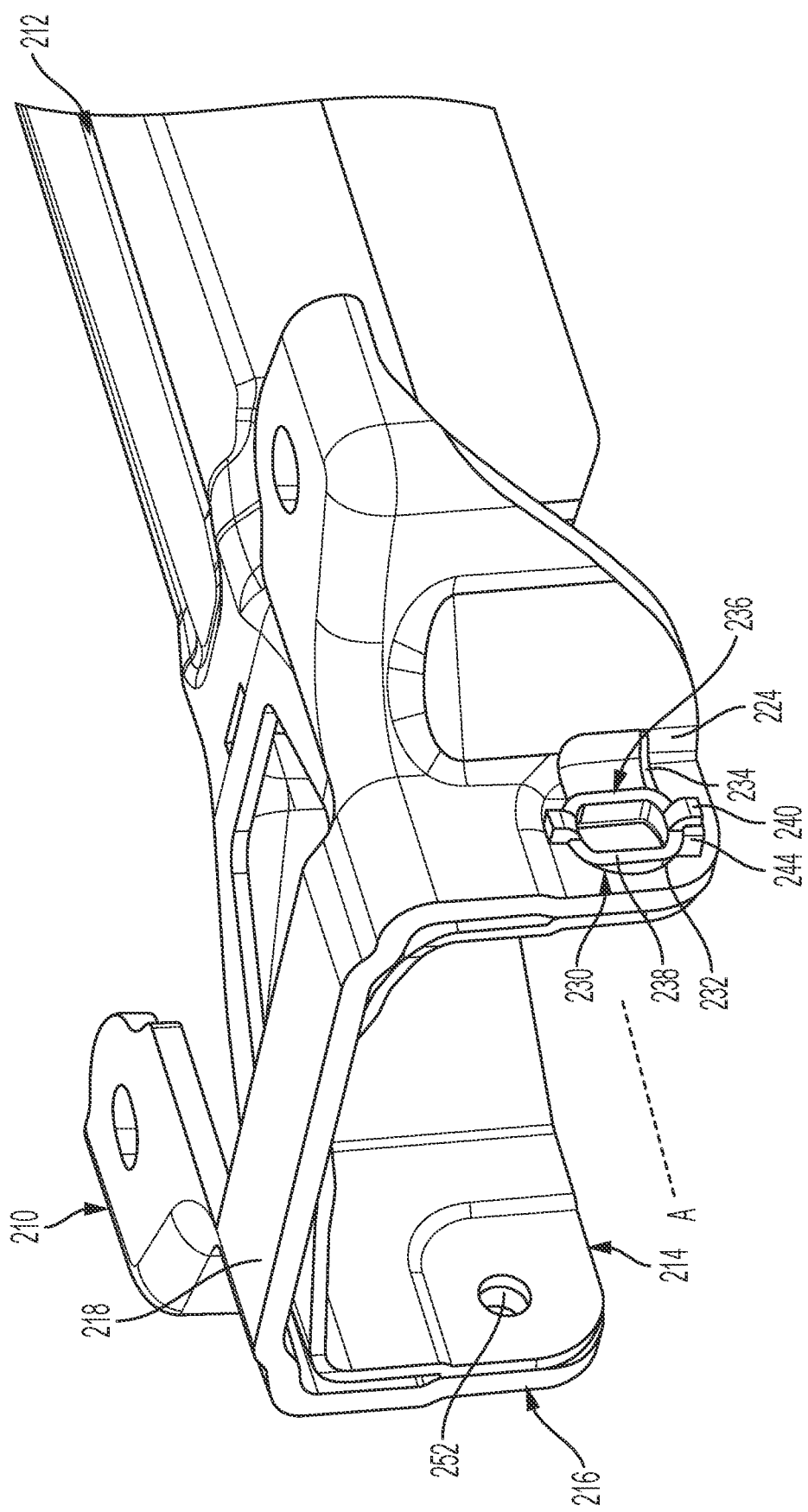
FIG. 3 generally illustrates a mounting bracket connected to a jacket according to a third arrangement of the present disclosure.

FIG. 3 generally illustrates a mounting bracket 210 connected to a jacket 212 according to a third arrangement of the present disclosure. The jacket 212 extends along an axis A and includes a pair of jacket mounting plates 214 for connection to the mounting bracket 210. More particularly, the mounting bracket 210 includes a pair of mounting bracket plates 216 spaced by a bridge 218 and extending to a flange 224. At least one of the mounting bracket plates 216 (e.g. both mounting bracket plates 216) includes a mating aperture 230. Each mating aperture 230 includes a pivot portion 232 that is circular and an insertion slot 234 that extends outwardly from the pivot portion 232. The insertion slot 234 may extend through the flange 224 to define a flange clearance. At least one of the jacket mounting plates 214 (e.g. both jacket mounting plates 214) includes a mating projection 236. Each mating projection 236 may include at least one tab 238 (e.g. a single tab 238 having opposing rounded ends) interfacing with opposite sides of the pivot portion 232 and a cantilever 240 extending from each of the opposing rounded ends of the tab 238 that overhang a surface of the mounting bracket plate 216 surrounding the pivot portion 232. As illustrated, one of the two pairs of interfacing jacket mounting plates 214 and mounting bracket plates 216 may not include a mating aperture 230 or mating projection 236. Instead, the pair of interfacing jacket mounting plates 214 and mounting bracket plates 216 may have a fastener aperture 252 extending therefrom to receive a fastener (not shown) or the like. A pair of opposing inclined ramps 244 may be aligned with each cantilever 240.

Figure 4:
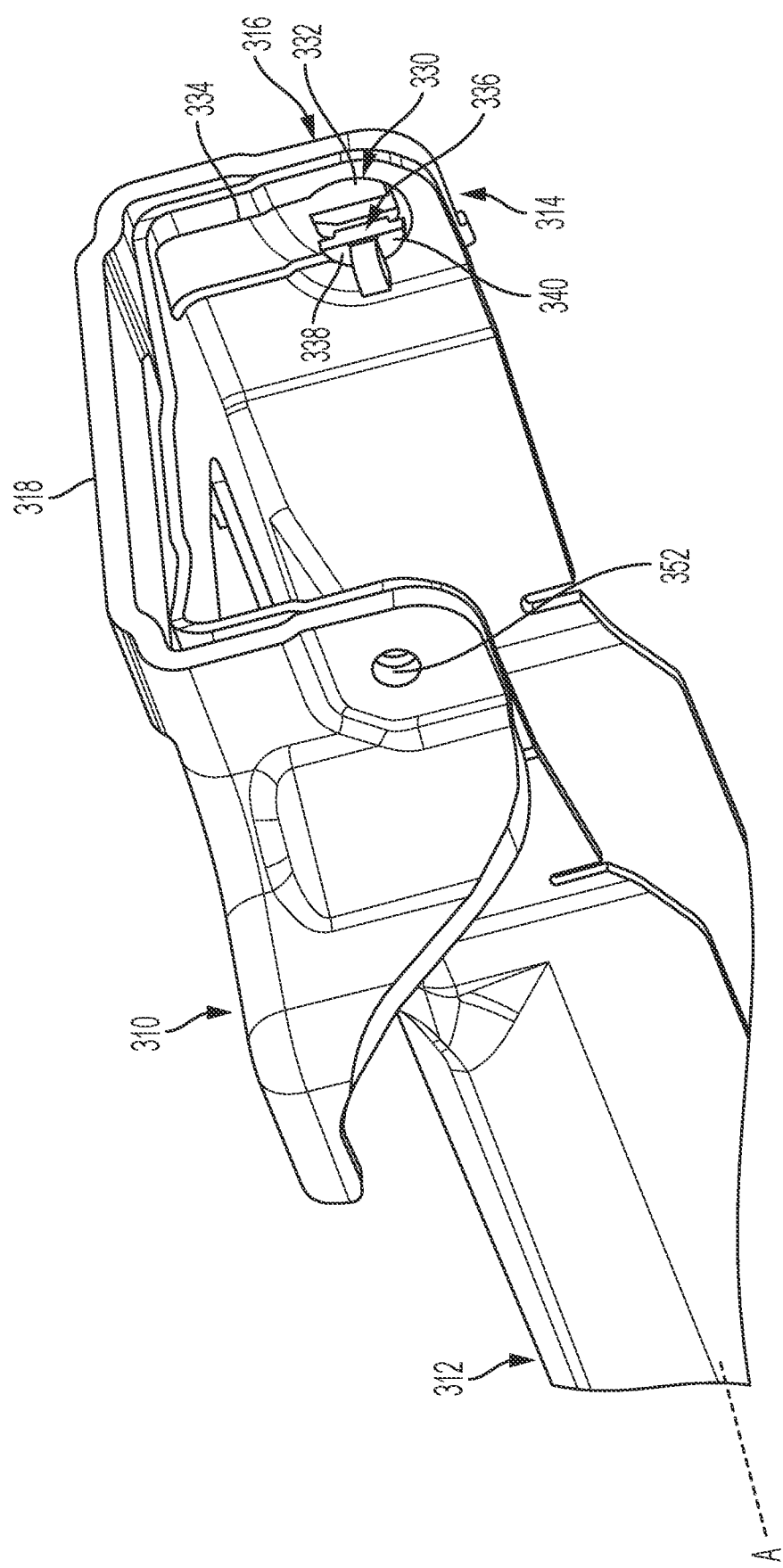
FIG. 4 generally illustrates a mounting bracket connected to a jacket according to a fourth arrangement of the present disclosure.

FIG. 4 generally illustrates an end view of the mounting bracket 310 connected to the jacket 312 according to a fourth arrangement of the present disclosure. The jacket 312 extends along an axis A and includes a pair of jacket mounting plates 314 for connection to the mounting bracket 310. More particularly, the mounting bracket 310 includes a pair of mounting bracket plates 316 spaced by a bridge 318. At least one of the jacket mounting plates 314 (e.g. both jacket mounting plates 314) includes a mating aperture 330. Each mating aperture 330 includes a pivot portion 332 that is circular and an insertion slot 334 that extends outwardly from the pivot portion 332. At least one of the mounting bracket plates 316 (e.g. both mounting bracket plates 316) includes a mating projection 336 extending inwardly. Each mating projection 336 may include at least one tab 338 (e.g. a pair of diametrically opposed tabs 338 or a single tab 338) interfacing with sides of the pivot portion 332 and a cantilever 340 having a rounded shape extending from each tab 338 that overhang an inner surface of the jacket mounting plate 314 surrounding the pivot portion 332. As illustrated, one of the two pairs of interfacing jacket mounting plates 314 and mounting bracket plates 316 may not include a mating aperture 330 or mating projection 336. Instead, the pair of interfacing jacket mounting plates 314 and mounting bracket plates 316 may have a fastener aperture 352 extending therefrom to receive a fastener (not shown) or the like. The insertion slot 334 may extend from the pivot portion 332 upwardly into an upper surface of the jacket 312 that sits below the bridge 318 to form a clearance to facilitate assembly.

Figure 5:
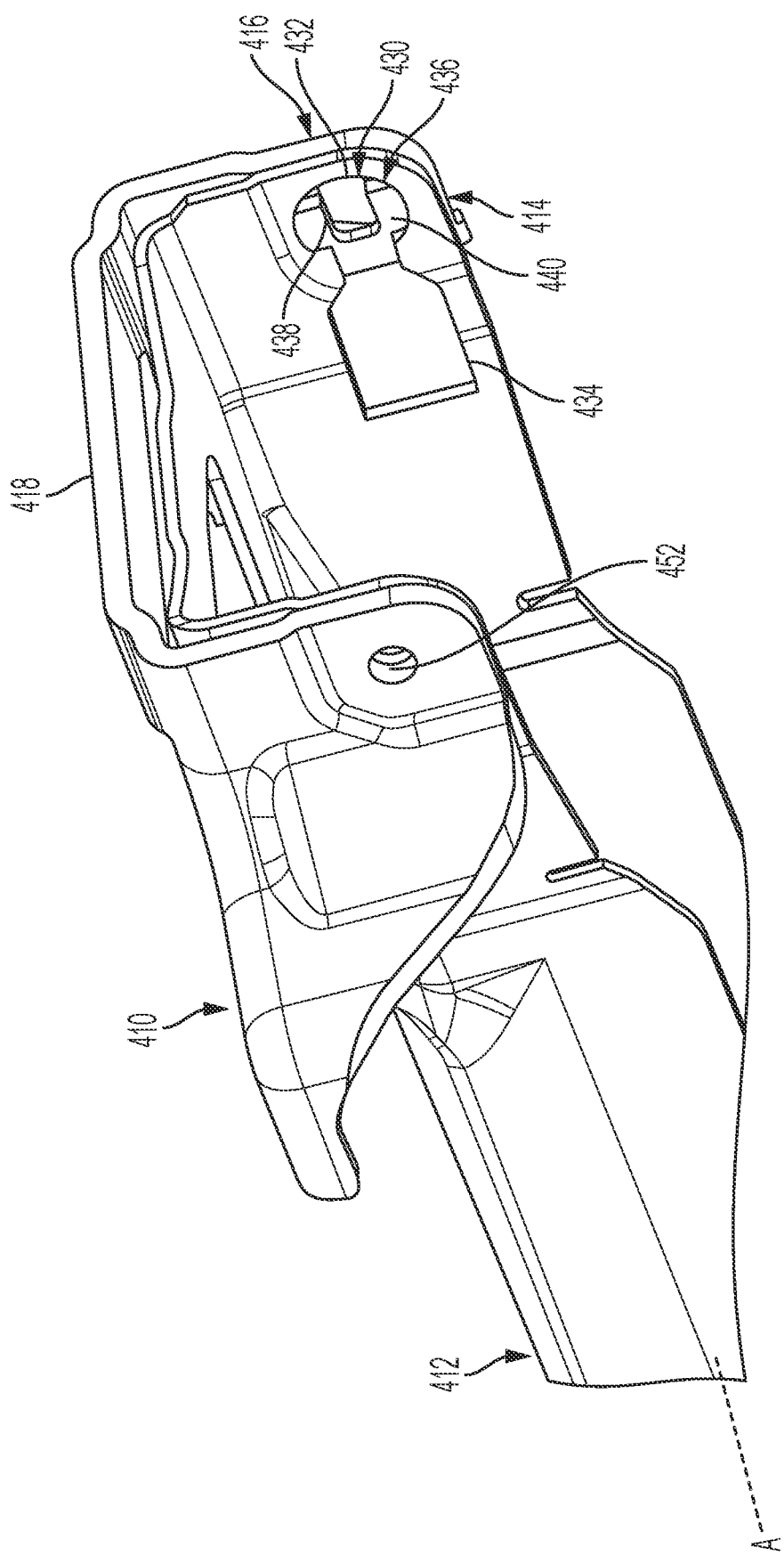
FIG. 5 generally illustrates a mounting bracket connected to a jacket according to a fifth arrangement of the present disclosure.

FIG. 5 generally illustrates an end view of a mounting bracket 410 connected to a jacket 412 according to a fifth arrangement of the present disclosure. The jacket 412 extends along an axis A and includes a pair of jacket mounting plates 414 for connection to the mounting bracket 410. More particularly, the mounting bracket 410 includes a pair of mounting bracket plates 416 spaced by a bridge 418. At least one of the jacket mounting plates 414 (e.g. both jacket mounting plates 414) includes a mating aperture 430. Each mating aperture 430 includes a pivot portion 432 that is circular and an insertion slot 434 that extends outwardly from the pivot portion 432. At least one of the mounting bracket plates 416 (e.g. both mounting bracket plates 416) includes a mating projection 436 extending inwardly. Each mating projection 436 may include at least one tab 438 (e.g. a pair of diametrically opposed tabs 438) interfacing with opposite sides of the pivot portion 432 and a cantilever 440 extending from each tab 438 that overhang a surface of the jacket mounting plate 414 surrounding the pivot portion 432. As illustrated, one of the two pairs of interfacing jacket mounting plates 414 and mounting bracket plates 416 may not include a mating aperture 430 or mating projection 436. Instead, the pair of interfacing jacket mounting plates 414 and mounting bracket plates 416 may have a fastener aperture 452 extending therefrom to receive a fastener (not shown) or the like. The insertion slot 434 may extend from the pivot portion 432 generally along a length of the jacket 412.

Figure 6:
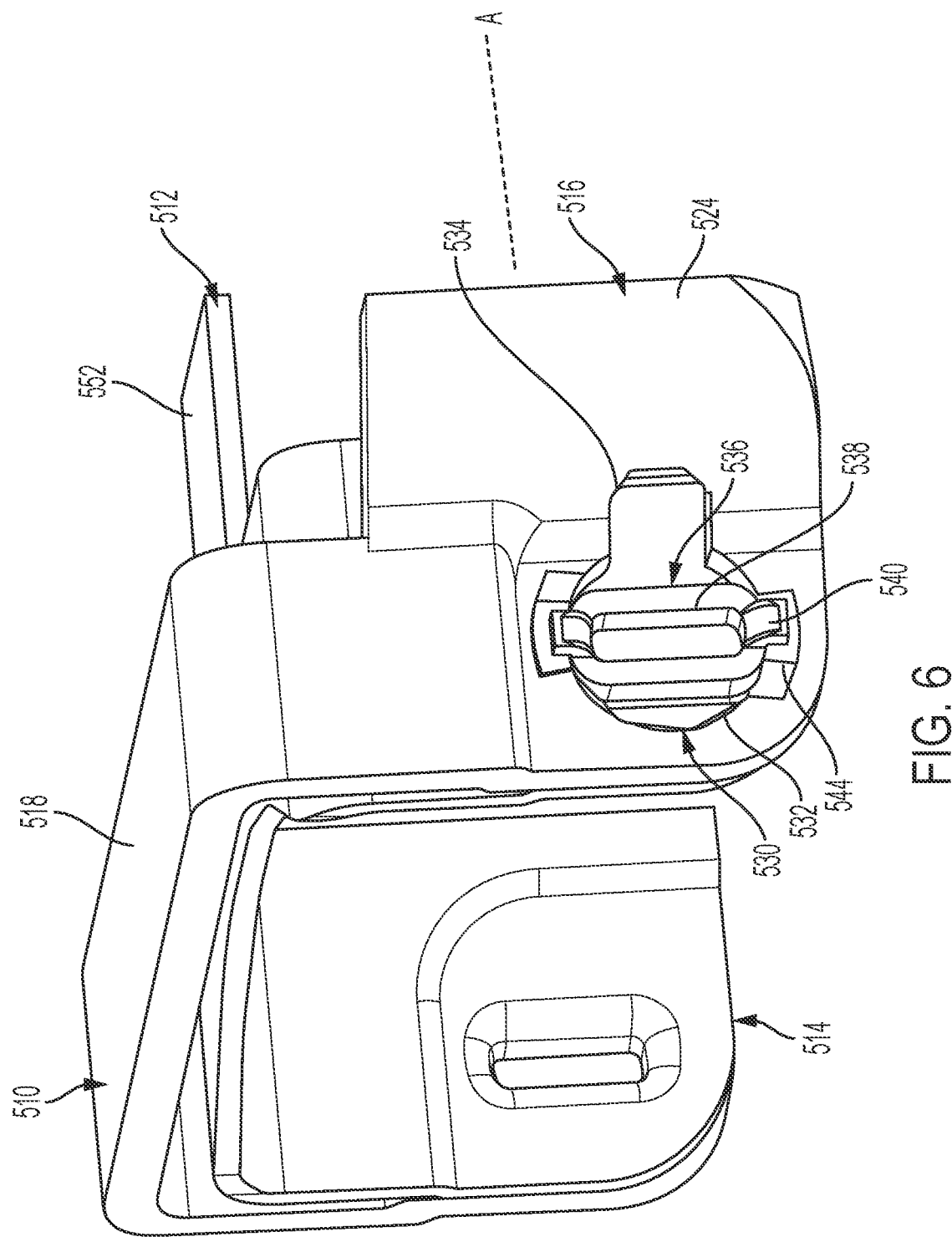
FIG. 6 generally illustrates a mounting bracket connected to a jacket according to a sixth arrangement of the present disclosure.

FIG. 6 generally illustrates a mounting bracket 510 connected to a jacket 512 according to a sixth arrangement of the present disclosure. The jacket 512 extends along an axis A and includes a pair of jacket mounting plates 514 for connection to the mounting bracket 510. More particularly, the mounting bracket 510 includes a pair of mounting bracket plates 516 spaced by a bridge 518 and extending to a flange 524. At least one of the mounting bracket plates 516 (e.g. both mounting bracket plates 516) includes a mating aperture 530. Each mating aperture 530 includes a pivot portion 532 that is circular and an insertion slot 534 that extends outwardly from the pivot portion 532. The insertion slot 534 may extend through the flange 524 to define a flange clearance. At least one of the jacket mounting plates 514 (e.g. both jacket mounting plates 514) includes a mating projection 536. Each mating projection 536 may include at least one tab 538 (e.g. a single tab 538 having opposing rounded ends) interfacing with opposite sides of the pivot portion 532 and a cantilever 540 extending from each of the rounded ends of the tab 538 that overhang a surface of the mounting bracket plate 516 surrounding the pivot portion 532. The insertion slot 534 may be narrower than the arrangement previously shown in FIG. 3 to permit additional pivotal movement between the mounting bracket 510 and the jacket 512. A pair of opposing inclined ramps 544 may be aligned with each cantilever 540. It should be appreciated that the jacket 512 may be a multi-piece component. As such, the jacket 512 may include a buckle 552 that may be sized for connection with a second jacket portion (not shown).

Figure 7:
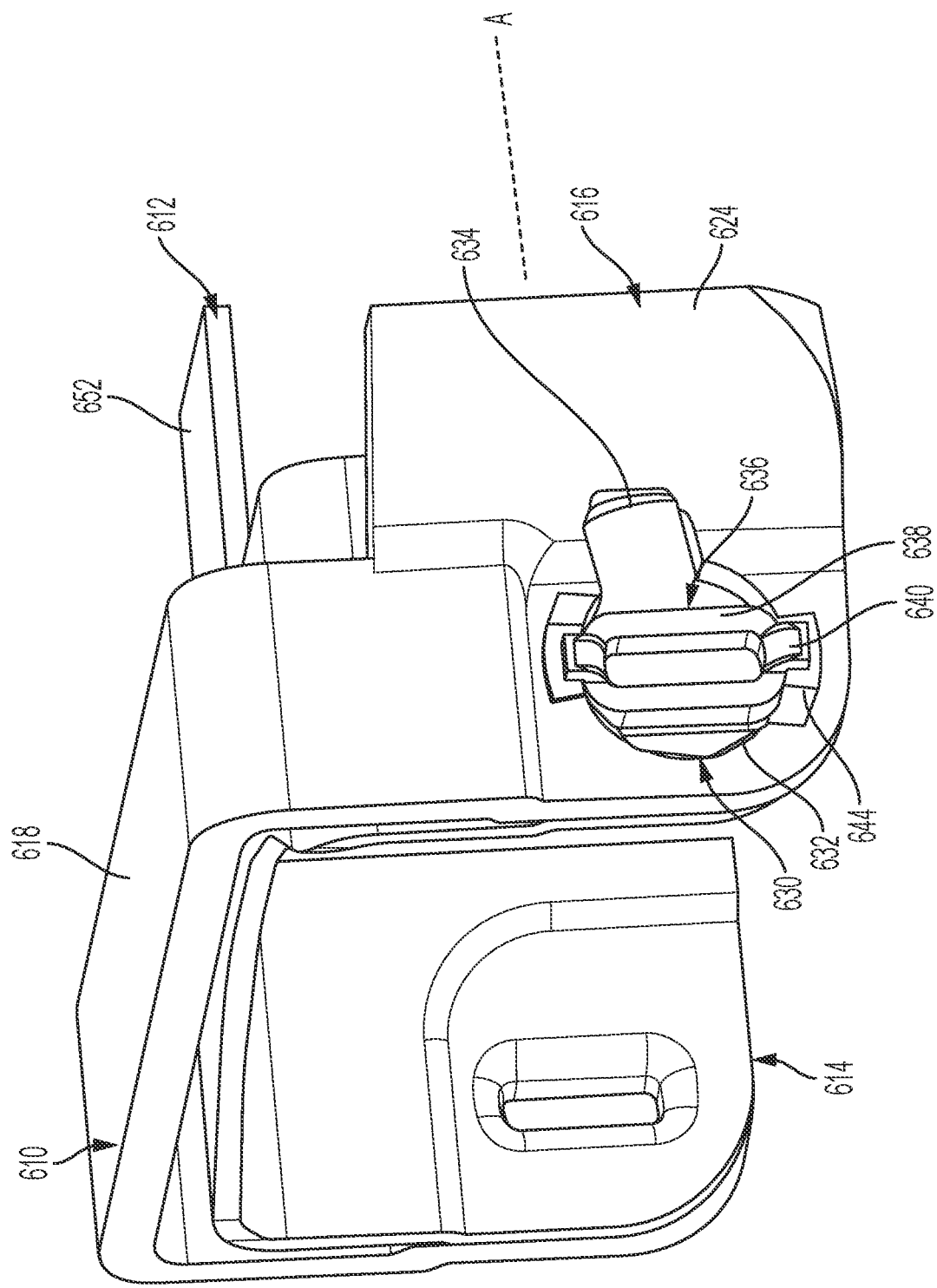
FIG. 7 generally illustrates a mounting bracket connected to a jacket according to a seventh arrangement of the present disclosure.

FIG. 7 generally illustrates a mounting bracket 610 connected to a jacket 612 according to a seventh arrangement of the present disclosure. The seventh arrangement has a similar configuration to the sixth arrangement, however, an insertion slot 634 locked on a mounting bracket plate 526 is angled upwardly (e.g. in an angle less than 90° from the bridge 618 and/or axis A). As such, the insertion slot 634 is at an angle to permit additional pivotal movement between the mounting bracket 610 and the jacket 612 before a pair of cantilevers 640 are aligned with a length of the insertion slot 634. It should be appreciated that the jacket 612 may be a multi-piece component. As such, the jacket 612 may include a buckle 652 that may be sized for connection with a second jacket portion (not shown).

Figure 8:
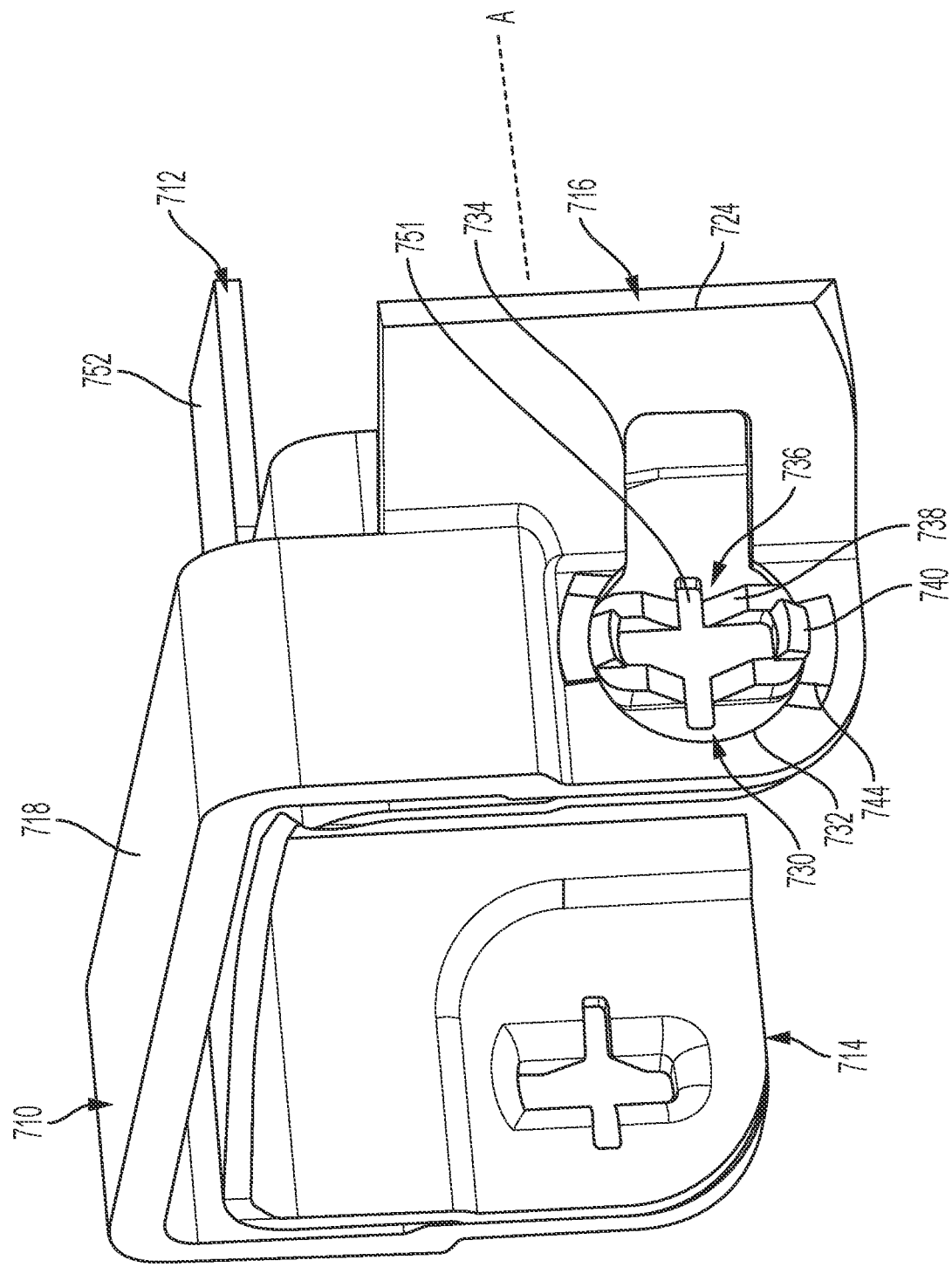
FIG. 8 generally illustrates a mounting bracket connected to a jacket according to an eighth arrangement of the present disclosure.

FIG. 8 generally illustrates a mounting bracket 710 connected to a jacket 712 according to an eighth arrangement of the present disclosure. In the eighth arrangement, at least one of a pair of mounting bracket plates 716 (e.g. both mounting bracket plates 716) includes a mating projection 736. Each mating projection 736 may include at least one tab 738 (e.g. a pair of diametrically opposed tabs 738) for interfacing with opposite sides of a pivot portion 732. A cantilever 740 extends from each of the rounded ends of the tab 738 that overhang a surface surrounding the pivot portion 732. Each tab 738 may include a U-shaped wall having a rounded end interfacing with the pivot portion 732. Because of the rigidity of the U-shape design, a flex slot 751 may separate the tabs 738 to permit a compression fit as previously described herein. It should be appreciated that the jacket 712 may be a multi-piece component. As such, the jacket 712 may include a buckle 752 that may be sized for connection with a second jacket portion (not shown).

Figure 9:
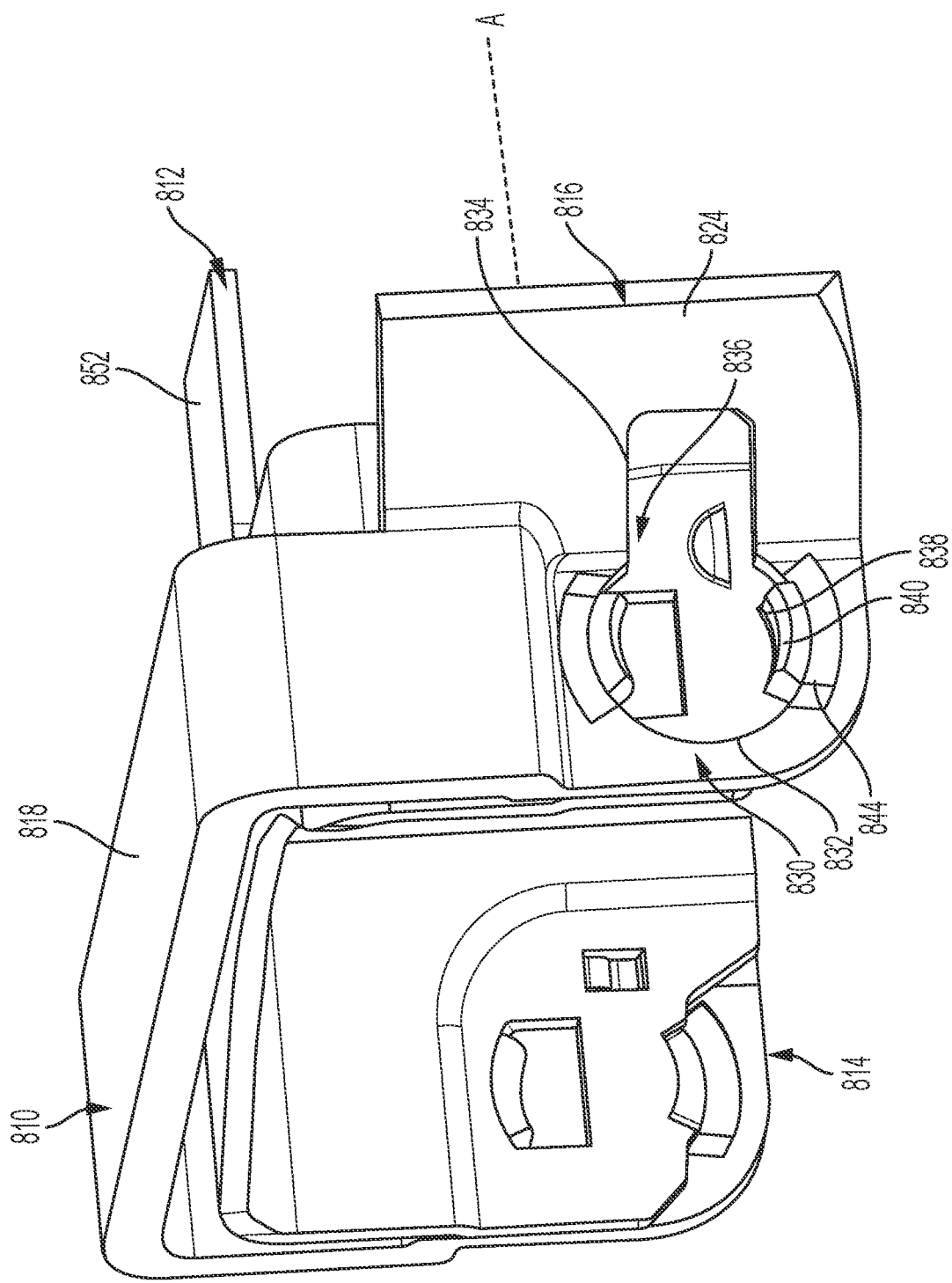
FIG. 9 generally illustrates a mounting bracket connected to a jacket according to a ninth arrangement of the present disclosure.

FIG. 9 generally illustrates a mounting bracket 810 connected to a jacket 812 according to a ninth arrangement of the present disclosure. In the ninth arrangement, a pair of tabs 838 may include cantilevers 840 that are define rounded profiles that cover substantially more of a surface surrounding a pivot portion 832 (e.g. at least 30%). An insertion slot 834 may be wider than those previously presented to receive the cantilevers 840 during assembly. It should be appreciated that the jacket 812 may be a multi-piece component. As such, the jacket 812 may include a buckle 852 that may be sized for connection with a second jacket portion (not shown).

Figure 10B:
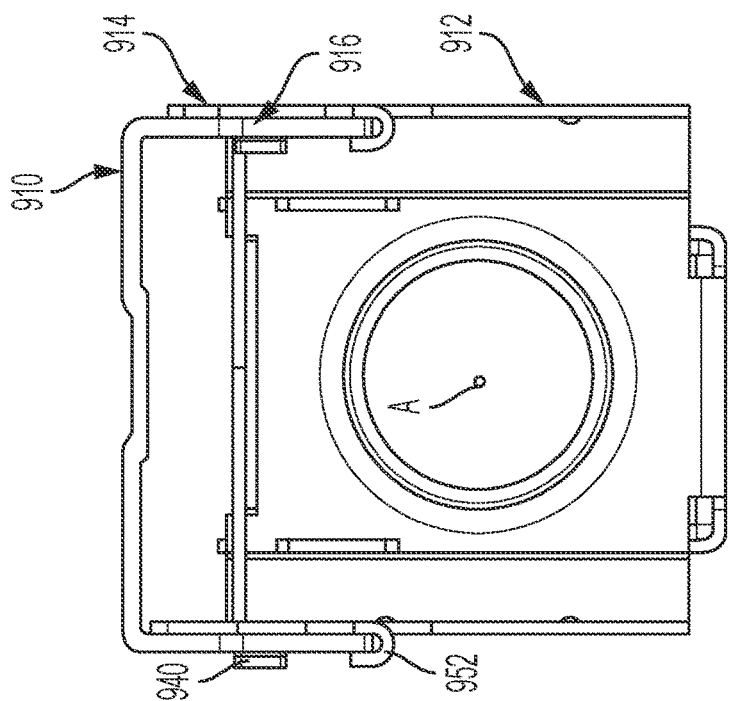
FIG. 10B generally illustrates an end view of the mounting bracket connected to the jacket in accordance with the tenth arrangement.
Figure 10A:
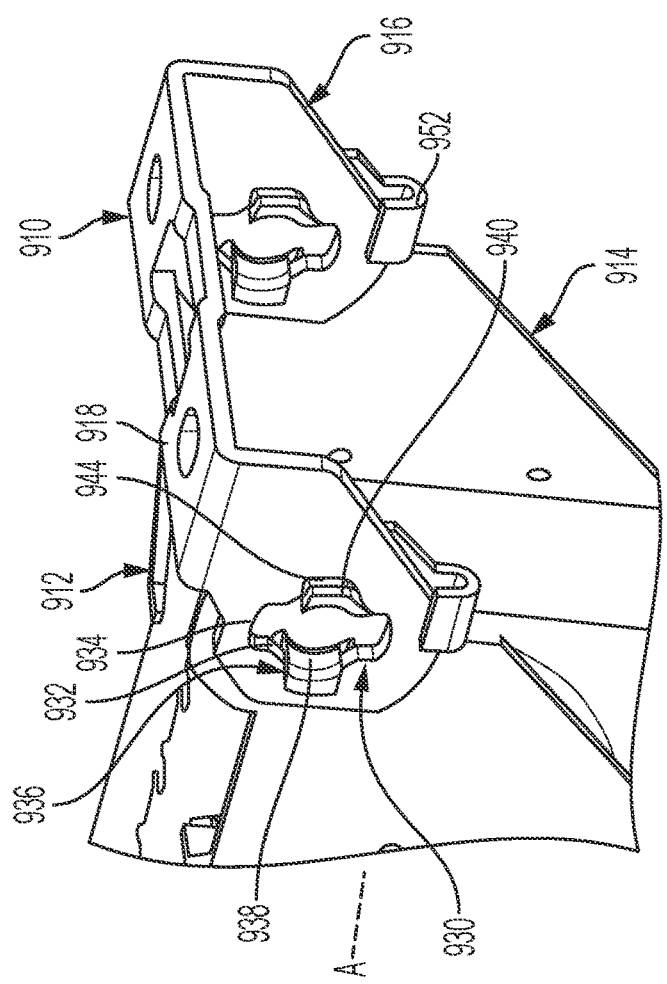
FIG. 10A generally illustrates a mounting bracket connected to a jacket according to a tenth arrangement of the present disclosure.

FIG. 10A and FIG. 10B generally illustrate a mounting bracket 910 connected to a jacket 912 according to a tenth arrangement of the present disclosure. In the tenth arrangement, the mounting bracket 910 includes a pair of mounting bracket plates 916 with mating apertures 930 and the jacket 912 includes a pair of jacket mounting plates 914 with mating projections 936. The mounting bracket plates 916 are paired with the jacket mounting plates 914 in an asymmetrical configuration. More particularly, one of the mounting bracket plates 916 are disposed on an outer surface of one of the jacket mounting plates 914 and the other mounting bracket plate 916 is disposed on an inner surface of the other jacket mounting plates 914. A retainer 952 extends from each of the jacket mounting plates 914 and includes a U-shape that cradles a bottom, outer edge of the respective mounting bracket plates 916. The retainers 952 may limit pivotal movement between the mounting bracket 910 and the jacket 912. The retainer(s) 952 also provide redundant retention along the axis of rotation of the mounting bracket 910. As illustrated, the mating apertures 930 may include an insertion slot 934 that extends through both sides (e.g. diametrically) of a pivot portion 932. A bump 944 that interfaces with a cantilever 940 may be located around the pivot portion 932 between each of the insertion slot 934 extensions (e.g. centrally between).

Figure 11:
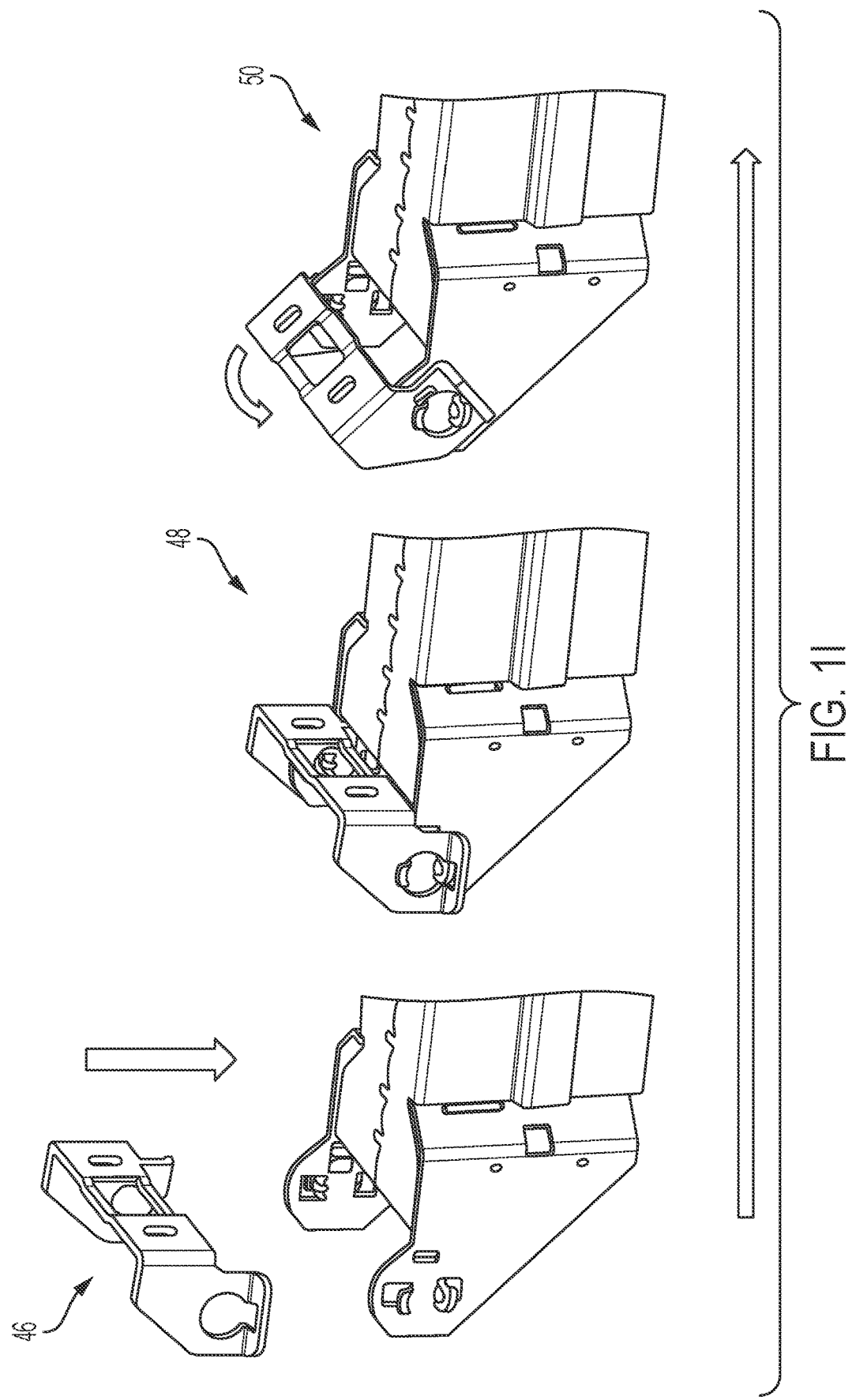
FIG. 11A generally illustrates a mounting bracket connected to a jacket according to an eleventh arrangement of the present disclosure.
FIG. 11B generally illustrates a lower view of the mounting bracket connected to the jacket in accordance with the eleventh arrangement.

FIG. 11A and FIG. 11B generally illustrates a mounting bracket 1010 connected to a jacket 1012 according to a eleventh arrangement of the present disclosure. In the eleventh arrangement, the mounting bracket 1010 includes a pair of mounting bracket plates 1016 with mating apertures 1030 and the jacket 1012 includes a pair of jacket mounting plates 1014 with mating projections 1036. As illustrated, the mating apertures 1030 may include an insertion slot 1034 that is narrow and extends through both sides (e.g. diametrically) of a pivot portion 1032. One extension of the insertion slot 1034 may extend through an outer edge of the mounting bracket plates 1016 such that a flange clearance is not necessary. The mating projections 1036 may each include a single tab 1038 that includes oppositely extending cantilevers 1040. As best illustrated in FIG. 11B, the cantilevers 1040 may be plate-shaped and include a bend 152 that interfaces with a surface surrounding the pivot portion 1032. The tabs 1038 may be compression fit around the jacket 1012 such that they are biased inwardly. An inner projection 1053 may further bend the cantilevers 1040 away from the jacket mounting plate 1014 for increased inwardly bias forces and rigidity. The surface surrounding the pivot portion 1032 may include one or more ramps 1044 (e.g. oppositely inclined ramps).

In the above-described embodiments, it is to be understood that the disclosed cantilever may not be present in some embodiments. The cantilever may assist with delashing the assembly, but lateral, or cross-car, delashing may be adequately provided for with the interference fit between mounting bracket plate and jacket plate in some embodiments.

Figure 12A:
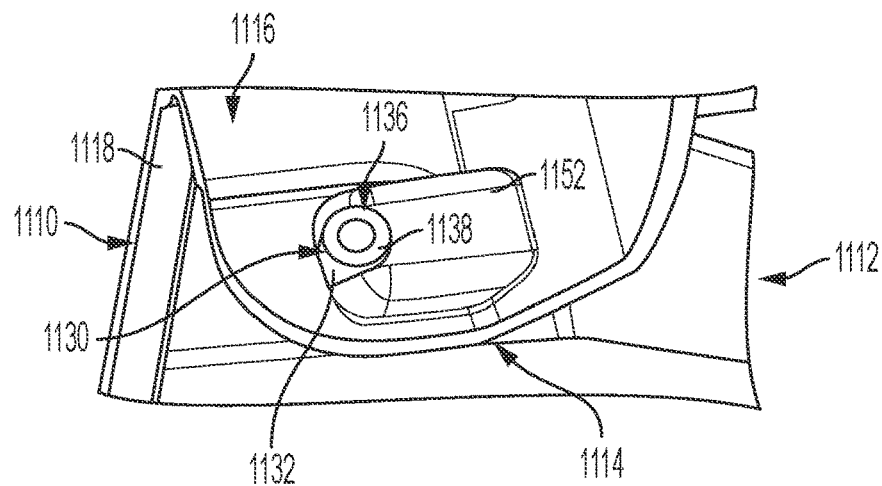
FIG. 12A generally illustrates a mounting bracket connected to a jacket according to a twelfth arrangement of the present disclosure.
Figure 12B:
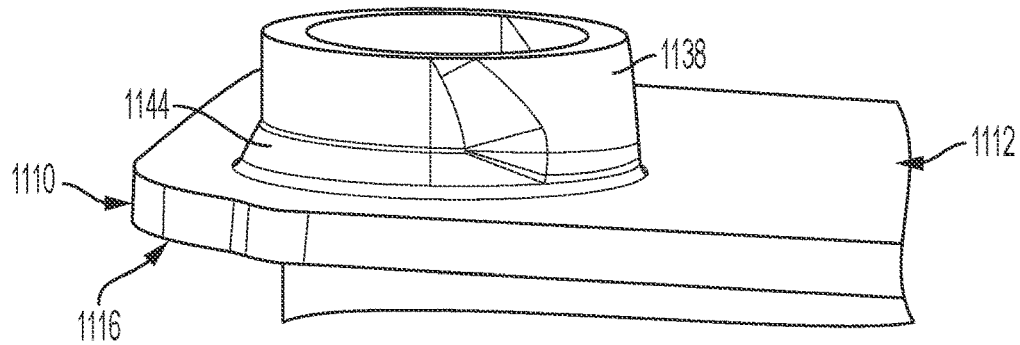
FIG. 12B generally illustrates an interfacing connection portion of the jacket in accordance with the twelfth arrangement.
Figure 12C:
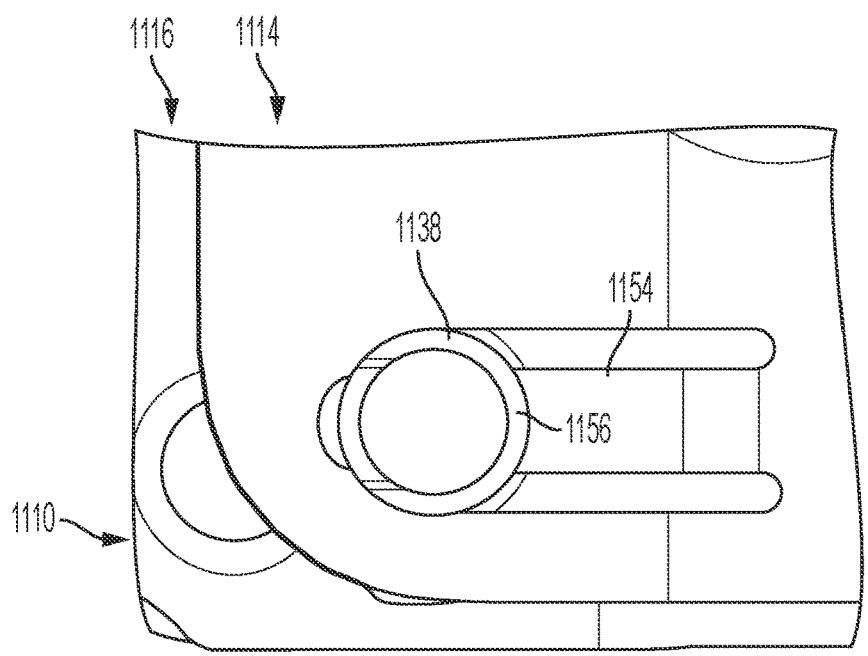
FIG. 12C generally illustrates an interior view of the mounting bracket connected to a jacket in accordance with the twelfth arrangement.

FIG. 12A through FIG. 12C generally illustrate a mounting bracket 1110 connected to a jacket 1112 according to a twelfth arrangement of the present disclosure. In the twelfth arrangement, the mounting bracket 1110 includes a pair of mounting bracket plates 1116 with mating apertures 1130 and the jacket 1112 includes a pair of jacket mounting plates 1114 with mating projections 1136. As illustrated, the mating projections 1136 may include a circular tab 1138 that extends through and interfaces with an outer edge of a pivot portion 1132 of the mating aperture 1130. Rather than an insertion slot, the mounting bracket plates 1116 may define an enclosed channel 1152 for receiving the tabs 1138 during linear movement of assembly. As best illustrated in FIG. 12B, the tabs 1138 may include ramps 1144 near a base thereof. As best illustrated in FIG. 12C, the jacket mounting plates 1114 may include a spring finger 1154 extending into the channel 1152 to a rounded end 1156 that interfaces with the tab 1138. The spring fingers 1154 may flex outwardly during assembly (e.g. via pressure of the tabs 1138) and snap into place once the tabs 1138 are located in the pivot portions 1132. The surface of the tab(s) 1138 that faces the spring finger 1154 and the rounded end 1156 is substantially geometrically conical or an inclined cylinder. This allows it to act as a delashing wedge when the spring finger 1154 snaps into place.

Figure 13A:
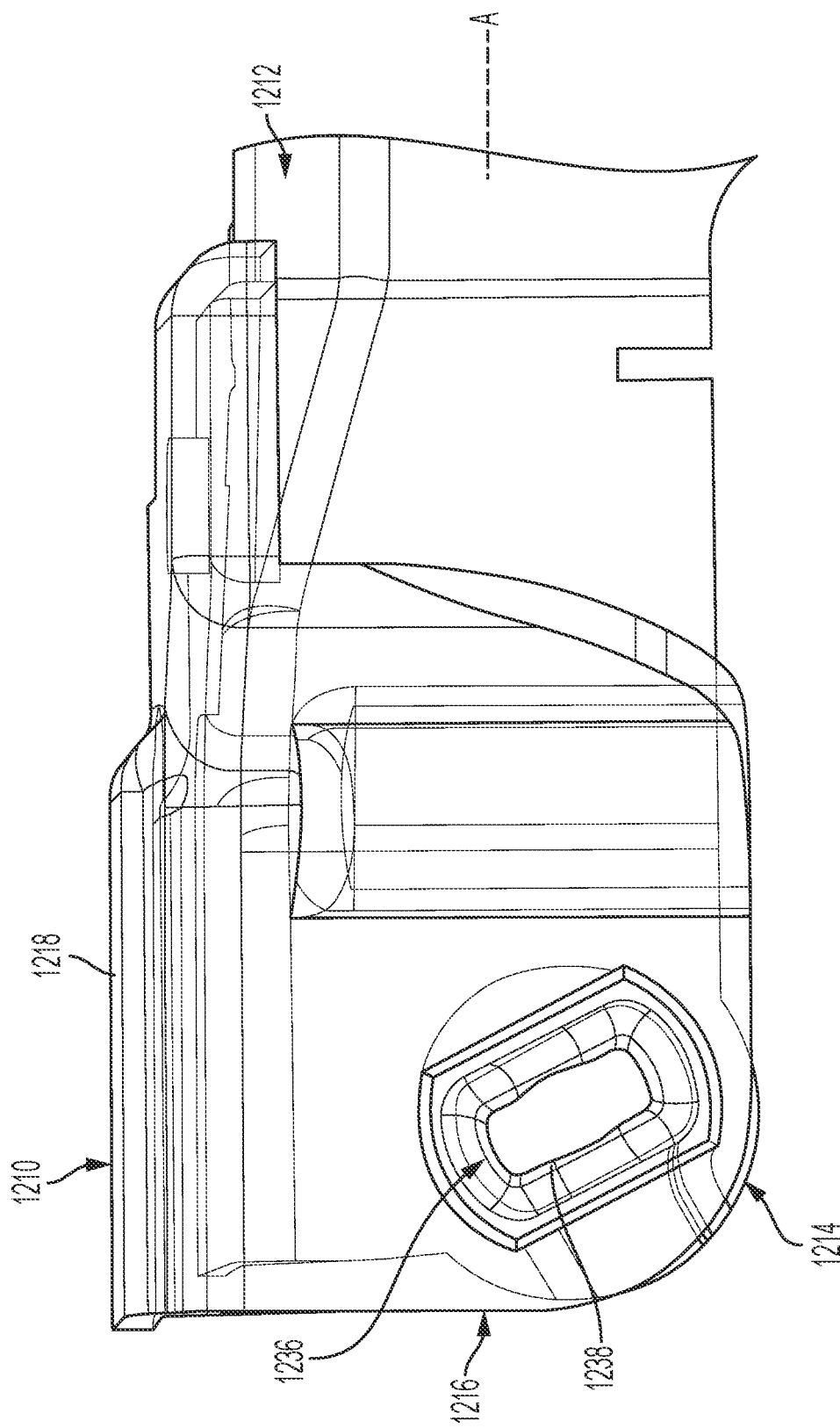
FIG. 13A generally illustrates a mounting bracket connected to a jacket according to a thirteenth arrangement of the present disclosure.
Figure 13B:
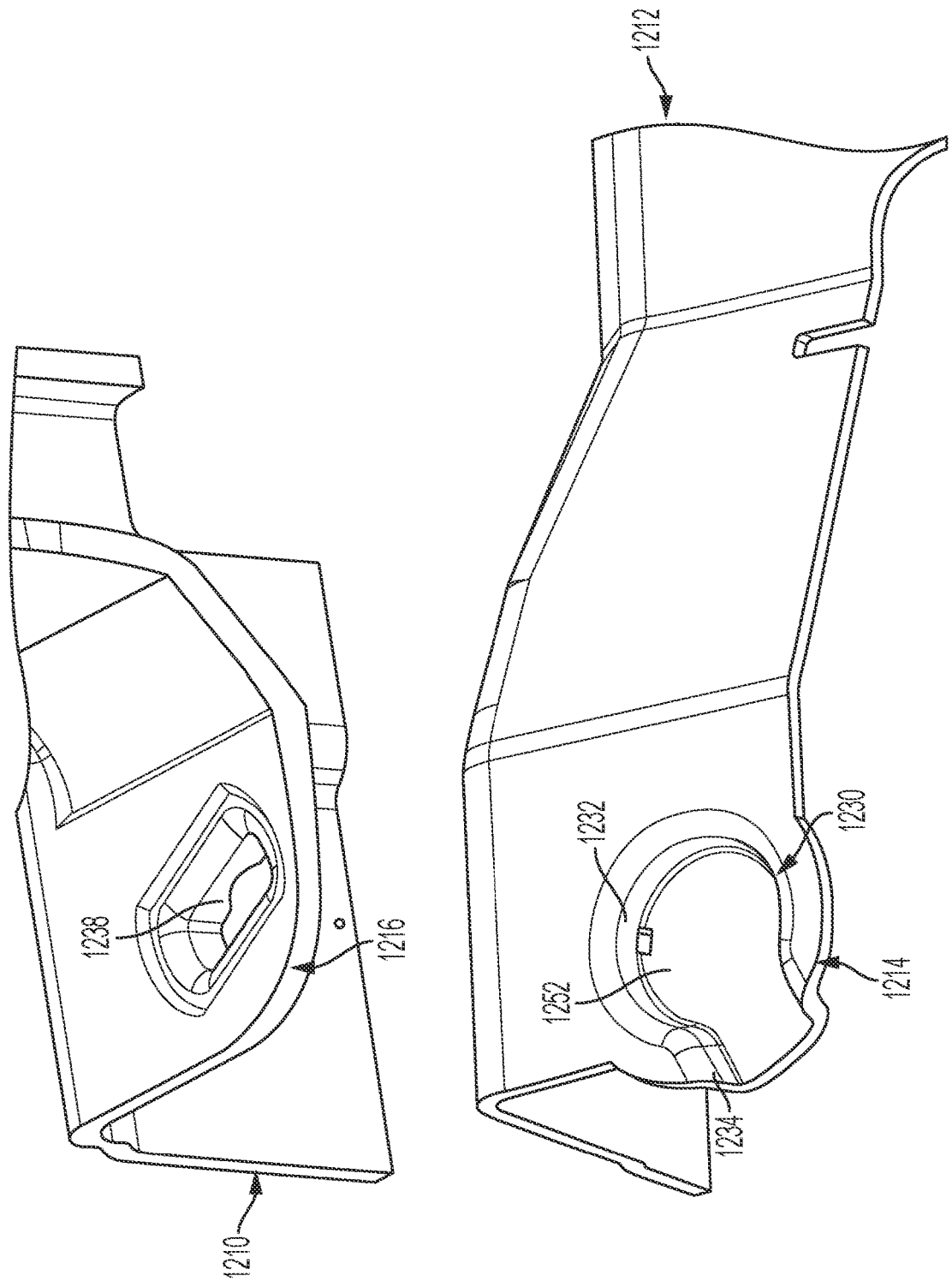
FIG. 13B generally illustrates the mounting bracket and the jacket in a disconnected state in accordance with the thirteenth arrangement.

FIG. 13A and FIG. 13B generally illustrate a mounting bracket 1210 connected to a jacket 1212 according to a thirteenth arrangement of the present disclosure. In the thirteenth arrangement, the mounting bracket 1210 includes a pair of mounting bracket plates 1216 with mating projections 1236 and the jacket 1212 includes a pair of jacket mounting plates 1214 with mating apertures 1230. As illustrated, the mating projections 1236 may include a tab 1238 having an elongated shape with opposite rounded edges that interface with an outer edge of a pivot portion 1232 of the mating aperture 1230. The mating aperture 1230 may include a bottom 1252 such that it does not extend entirely though the jacket 1212. The mating aperture 1230 may further include an insertion slot 1234 extending to an outer edge of the jacket mounting plate 1214. The bottom 1252 may also extend along the insertion slot 1234.

Figure 14:
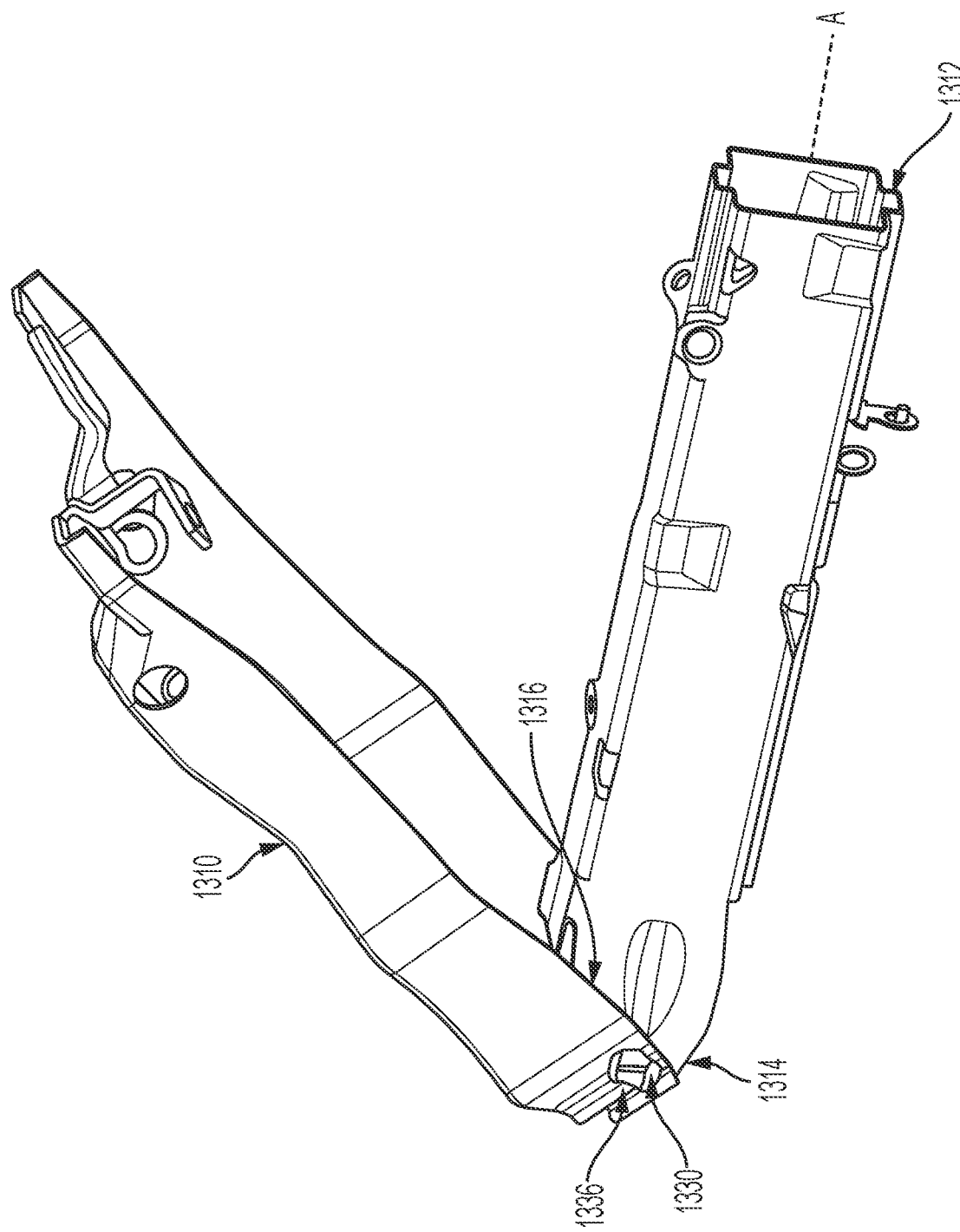
FIG. 14 generally illustrates a mounting bracket connected to a jacket according to a fourteenth arrangement of the present disclosure.

FIG. 14 generally illustrates a mounting bracket 1310 connected to a jacket 1312 according to a fourteenth arrangement of the present disclosure. In the fourteenth arrangement, the mounting bracket 1310 includes a pair of mounting bracket plates 1316 with mating apertures 1330 and the jacket 1312 includes a pair of jacket mounting plates 1314 with mating projections 1336. As illustrated, the mounting bracket 1310 is configured as a roof bracket with an elongated body and one or more openings 1319 at an end of the roof bracket opposite the mounting bracket plates 1316 for mounting to a vehicle with fasteners (not shown). The assembly for this embodiment is substantially identical to the embodiment disclosed in FIG. 1, but the mounting bracket 1310 is the unification of the upper and lower mounting brackets. It should be appreciated that the mounting brackets in the other arrangements could also be configured as roof brackets.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description.

What is claimed is:

1. A steering column assembly comprising:
   a jacket extending along an axis and including a pair of jacket mounting plates on opposite sides of the axis;
   a mounting bracket including a pair of mounting bracket plates spaced by a bridge, wherein each of the mounting bracket plates is operably connected to a jacket mounting plate;
   at least one of the mounting bracket plates including a mating aperture defined by a pivot portion that is circular and an insertion slot extending outwardly from the pivot portion;
   at least one of the jacket mounting plates including a mating projection that includes at least one tab interfacing with opposite sides of the pivot portion; and
   wherein the insertion slot is sized to allow the at least one tab to be inserted therein during assembly.

2. The steering column assembly of claim 1, further comprising a cantilever extending from the at least one tab that overhangs a surface of the mounting bracket plate surrounding the pivot portion.

3. The steering column assembly of claim 2, wherein the at least one tab includes a pair of tabs with each tab including a cantilever.

4. The steering column assembly of claim 3, wherein each of the tabs are located on opposite sides of the pivot portion and include round exterior surfaces that interface an outer edge of the pivot portion.

5. The steering column assembly of claim 4, wherein the rounded exterior surfaces define a projection diameter and the outer edge of the pivot portion defines an aperture diameter and wherein the outer edge of the pivot portion compresses the projection diameter such that the tabs are biased inwardly.

6. The steering column assembly of claim 4, wherein the at least one mounting bracket plate includes a bump aligned with each cantilever that bend the cantilevers outwardly.

7. The steering column assembly of claim 4, wherein the at least one mounting bracket plate defines a pair of oppositely inclined ramps that bend the cantilevers outwardly.

8. The steering column assembly of claim 4, wherein the at least one mounting bracket plate includes a hard stop projection for interfacing with the cantilevers and limiting pivotal movement between the mounting bracket and the jacket.

9. The steering column assembly of claim 4, wherein the slot is transverse to each of the tabs.

10. The steering column assembly of claim 4, wherein the slot includes a first slot extension extending from a first portion of the pivot portion and a second slot extension extending from an opposite side of the pivot portion.

11. The steering column assembly of claim 10, wherein the at least one jacket plate includes a u-shape retainer for interfacing with an outer edge of the mounting bracket plate and limiting pivotal movement between the mounting bracket and the jacket.

12. The steering column assembly of claim 1, wherein the jacket defines an anti-rotation projection extending into the slot.

13. The steering column assembly of claim 12, wherein the anti-rotation projection is sized to move within the slot to permit a limited degree of pivotal movement between the mounting bracket and the jacket.

14. The steering column assembly of claim 1, wherein inner surfaces of the mounting bracket plates are connected to outer surfaces of the jacket mounting plates and wherein the mounting bracket plates are flexed outwardly by the jacket mounting plates.

15. The steering column assembly of claim 1, wherein the mounting bracket plate includes a flange extending transversely therefrom and the flange defines a portion of the slot for permitting the mating projection to be inserted therethrough during assembly.

16. The steering column assembly of claim 1, wherein the slot extends through an outer edge of mounting bracket plate.

17. The steering column assembly of claim 1, wherein the jacket plates are located between the axis and the mounting bracket plates.

18. The steering column assembly of claim 1, wherein one jacket plate is connected to an interior surface of a mounting bracket plate and the other jacket plate is connected to an exterior surface of the other mounting bracket.

19. A steering column assembly comprising:
   a jacket extending along an axis and including a pair of jacket mounting plates on opposite sides of the axis;
   a mounting bracket including a pair of mounting bracket plates spaced by a bridge, wherein each of the mounting bracket plates is operably connected to a jacket mounting plate;

at least one of the jacket mounting plates including a mating aperture defined by a pivot portion that is circular and an insertion slot extending outwardly from the pivot portion;

at least one of the mounting bracket plates including a mating projection that includes at least one tab extending inwardly to interface with opposite sides of the pivot portion and a cantilever extending from the at least one tab that overhangs a surface of the jacket mounting plate surrounding the pivot portion; and wherein the insertion slot is sized to allow the cantilever and the at least one tab to be inserted therein during assembly.

20. The steering column assembly of claim 19, wherein the at least one tab includes a pair of tabs with each tab including a cantilever extending in opposite directions.

\* \* \* \* \*